US008852337B2

(12) United States Patent
Tanaka et al.

(10) Patent No.: US 8,852,337 B2
(45) Date of Patent: Oct. 7, 2014

(54) FIBER REINFORCED CEMENT BASED MIXED MATERIAL

(75) Inventors: Yoshihiro Tanaka, Tokyo (JP); Osamu Hashimoto, Tokyo (JP); Kazuhiko Nishi, Tokyo (JP)

(73) Assignee: Taisei Corporation, Tokyo (JP)

( * ) Notice: Subject to any disclaimer, the term of this patent is extended or adjusted under 35 U.S.C. 154(b) by 0 days.

(21) Appl. No.: 14/000,100

(22) PCT Filed: Feb. 7, 2012

(86) PCT No.: PCT/JP2012/052682
§ 371 (c)(1),
(2), (4) Date: Aug. 16, 2013

(87) PCT Pub. No.: WO2012/111474
PCT Pub. Date: Aug. 23, 2012

(65) Prior Publication Data
US 2013/0324643 A1  Dec. 5, 2013

(30) Foreign Application Priority Data

Feb. 18, 2011  (JP) .................................. 2011-033090

(51) Int. Cl.
*C04B 7/02*       (2006.01)
*C04B 28/02*      (2006.01)
*C04B 16/06*      (2006.01)
*C04B 111/34*     (2006.01)
*C04B 111/20*     (2006.01)

(52) U.S. Cl.
CPC ......... *C04B 16/0633* (2013.01); *C04B 2111/34* (2013.01); *C04B 28/02* (2013.01); *C04B 2111/2053* (2013.01)
USPC .......................................... 106/713; 106/644

(58) Field of Classification Search
USPC .................................................. 106/644, 713
See application file for complete search history.

(56) References Cited

U.S. PATENT DOCUMENTS

| 4,910,076 A | 3/1990 | Ando et al. |
| 5,503,670 A | 4/1996 | Richard et al. |
| 5,679,149 A * | 10/1997 | Tezuka et al. ................. 106/644 |
| 6,478,867 B1 | 11/2002 | Cheyrezy et al. |
| 6,723,162 B1 | 4/2004 | Cheyrezy et al. |
| 8,137,453 B2 * | 3/2012 | Tanaka et al. ................. 106/644 |
| 2010/0326326 A1 * | 12/2010 | Rigaud et al. ................. 106/709 |

FOREIGN PATENT DOCUMENTS

| JP | 63-22636 A | 1/1988 |
| JP | 09-500352 A | 1/1997 |
| JP | 11-116297 A | 4/1999 |

(Continued)

Primary Examiner — Paul Marcantoni
(74) Attorney, Agent, or Firm — Dickstein Shapiro LLP

(57) ABSTRACT

Provided is a fiber reinforced cement based mixed material capable of securing high tensile strength and high toughness even after development of a crack. A fiber reinforced cement based mixed material contains cement, a mineral admixture, water, a chemical admixture, aggregate particles, and fibers, the aggregate particles contained in the fiber reinforced cement based mixed material in a proportion of 50 to 95% in terms of a weight ratio to the total weight of the cement and the mineral admixture, wherein a mean particle diameter of the aggregate particles is 0.2 to 0.8 mm, and at least some of the fibers is formed to be a bumpy fiber having asperities formed in the surface thereof, and a ratio (h/H) of a depth h of each of recessed portions among the asperities of the bumpy fiber to a smallest cross-sectional diameter H thereof is 0.05 to 0.8.

8 Claims, 9 Drawing Sheets

(56) References Cited

FOREIGN PATENT DOCUMENTS

| JP | 11-246255 A | 9/1999 |
| JP | 2000-302494 A | 10/2000 |
| JP | 2002-514567 A | 5/2002 |
| JP | 2004-18352 A | 1/2004 |
| JP | 2005-306676 A | 11/2005 |
| JP | 2008-81338 A | 4/2008 |
| JP | 2009-234796 A | 10/2009 |

* cited by examiner

FIBER REINFORCED CEMENT BASED MIXED MATERIAL

TECHNICAL FIELD

The present invention relates to a fiber reinforced cement based mixed material having high strength which is manufactured by mixing fibers into a cement matrix containing no coarse aggregate.

BACKGROUND ART

Ultra-high-strength fiber reinforced concrete has been known which is obtained by mixing reinforcing fibers such as metal fibers or organic fibers into a cement matrix that is obtained by mixing cement and pozzolanic reaction particles (pozzolanic material) into aggregate particles having a largest aggregate particle diameter of 1 to 2 mm (see Patent Documents 1 to 3, etc).

Ultra-high-strength fiber reinforced concrete as described above has such a characteristic that it can secure a certain level of tensile strength and toughness even after development of a crack, by combining fibers having high tensile strength to a cement matrix being dense and having ultra high strength. Specifically, this has been considered to be due to a so-called bridging effect which allows the fibers to cover tensile force for the cement matrix when a crack is developed in the cement matrix as a result of tensile stress acting on the material.

For this reason, unlike conventional reinforced concrete, ultra-high-strength fiber reinforced concrete as described above does not require reinforcement with reinforcing steel bars. Moreover, a concrete structure built using ultra-high-strength fiber reinforced concrete as described above can achieve reduction in the thickness and weight of its components.

Moreover, ultra-high-strength fiber reinforced concrete as described above can achieve significant improvement in durability because the concrete is formed into a denser hydrated body through a hydration reaction process in which the cement matrix is thermally cured.

PRIOR ART DOCUMENTS

Patent Documents

Patent Document 1: Japanese Patent Application Publication No. Hei 11-246255
Patent Document 2: Published Japanese Translation of PCT International Application No. Hei 9-500352
Patent Document 3: Japanese Patent Application Publication No. 2002-514567
Patent Document 4: Japanese Patent Application Publication No. Hei 11-116297
Patent Document 5: Japanese Patent Application Publication No. 2000-302494

SUMMARY OF THE INVENTION

Problems to be Solved by the Invention

However, the conventional ultra-high-strength fiber reinforced concretes disclosed in Patent Documents 1 to 3 cannot be said to have sufficient bond between the cement matrix and the fibers. Regarding this matter, sufficient bonding force must be secured between the cement matrix and the fibers in order to sufficiently exert the bridging effect mentioned above.

To examine this point, Patent Documents 1, 2 are inventions that use steel fibers to reinforce the material of a cement matrix which is dense and has ultra high strength. However, as for the bond between the cement matrix and the fibers, Patent Documents 1, 2 merely suggest the minimum necessary bonding length by showing the relation between the length and diameter of each steel fiber.

Meanwhile, in order to increase the bond strength of each fiber, one may easily conceive of a method which involves increasing the fiber length to increase the bonding area, and a method which involves increasing the fiber diameter to increase the bonding area. However, increasing the fiber length may deteriorate the dispersion of the fibers within the cement matrix and also increase the probability of long fibers tangling each other, and thereby increase the risk of separation of fibers within the cement matrix. The consequence is that ultra-high-strength fiber reinforced concrete containing long fibers suffers from decreased fluidity. For this reason, there is a limit on increasing the fiber length.

On the other hand, as for the method involving increasing the fiber diameter, the cross-sectional area of each fiber, which relates to the strength of the fiber, is proportional to the diameter to the second power, whereas the bonding area, which relates to the bond strength, is proportional to the diameter to the first power. Thus, in view of the ratio between the bond strength and the fiber strength, increasing the fiber diameter cannot be said to be an effective method for increasing the bond strength.

Moreover, Patent Document 3 discloses a case where the reinforcing fibers are organic fibers and a case where the reinforcing fibers are a combination of organic fibers and metal fibers. However, as for the bonding power between the cement matrix and the fibers, Patent Document 3 merely suggests the relation between the length and diameter of each fiber as in the case of Patent Documents 1, 2 mentioned above.

For this reason, in the conventional ultra-high-strength fiber reinforced concretes, detachment of fibers (or slip between the cement matrix and fibers) occurs with tensile force lower than the tensile strength the fibers have. Thus, the conventional ultra-high-strength fiber reinforced concretes have not been able to fully utilize the tensile strength the mixed fibers originally possess.

Further, once slip occurs between the cement matrix and the fibers, the bonding force abruptly decreases, thereby causing a phenomenon in which the width of the crack widens abruptly, and also making it impossible to exert the bridging effect. Accordingly, sufficient toughness (or fracture energy) cannot be secured.

Meanwhile, it has been known that if organic fibers are to be mixed for reinforcing reinforced concrete, surface treatment may be performed so that the bonding force between conventional concrete and the organic fibers can be increased (see Patent Documents 4, 5, etc).

Here, Patent Document 4 discloses a technique which involves: embossing the surface of each fiber into an asperity pattern; and applying a surface treatment agent onto the fiber surface to improve the bonding force and hydrophilicity and thereby increase the chemical bond between concrete and the fiber.

Moreover, Patent Document 5 discloses a technique which involves forming each fiber itself into a wave form instead of a straight form to thereby increase the bonding force. Here, in Patent Document 4 or 5, the concrete material to be reinforced with the fibers is conventional concrete in which coarse aggregate is blended. As described, in the case where conventional concrete is the target, improving the initial bonding force between the fibers and the concrete is the primary object, and recovery of the bonding force after the bond between the fibers and the concrete is cut cannot be expected. Accordingly, major toughness improvement cannot be expected.

Conventional concrete ranges from normal concrete for use in civil engineering and architectural constructions to superplasticized concrete, high-strength concrete, mass concrete, underwater concrete, etc. depending upon the intended use, and is basically a material assuming reinforcement with reinforcing steel bars. In recent years, however, there is a trend to employ so-called fiber reinforced concrete (FRC) in which short fibers are mixed for the purpose of providing a supplemental function for steel bar reinforcement of the conventional concrete, preventing corner defects of members, and preventing cracking due to drying shrinkage. Aggregate particles blended in this concrete are formed of fine aggregate and coarse aggregate. In conventional concrete, a unit weight of aggregate contained in a unit volume of concrete is generally greater than the unit weight of powder (=unit weight of cement+unit weight of mineral admixture). For example, the most commonly used type of concrete is 400 to 700% when expressed in terms of a ratio of unit weight of aggregate/unit weight of powder. Even the ratio of high-performance concrete, which is said to contain a large amount of powder, is about 250 to 300%.

Moreover, the largest particle diameter of coarse aggregate used in conventional concrete is limited most often to 20 mm or 25 mm in the case of application to general structures, and limited to 40 mm or 80 mm in the case of application to dams and the like. Thus, in conventional reinforced concrete reinforced with fibers, the bonding mechanism between the fibers and the concrete does not rely on mechanical bond through the aggregate blended in the concrete but relies on chemical bond and frictional force between hydrated concrete (cement paste) and the fibers. Alternatively, in the case where the fiber surface is embossed or where each fiber is formed in a wave form as a whole, the bonding mechanism mainly relies on chemical bond obtained by filling hydrated concrete in such a way as to cover the periphery of the fiber with the hydrated concrete. Meanwhile, one may suppose that mechanical bond is exerted in some part; however, because many of the aggregate particles are larger than the asperity pattern of each fiber as mentioned earlier, it is impossible to expect such an effect that the aggregate particles engage with the asperity pattern by means of mechanical bond. The compressive and tensile strengths of conventional hydrated concrete are significantly lower than those of the fiber reinforced cement based mixed material of the present invention to be described later. Thus, even if the fibers are embossed, it is impossible to expect large chemical bond, and also to expect sufficient toughness because the fibers can easily be detached once the bond is cut.

In view of this, an object of the present invention is to provide a fiber reinforced cement based mixed material capable of securing high tensile strength and high toughness even after development of cracks.

Means for Solving the Problems

To achieve the above object, a fiber reinforced cement based mixed material of the present invention is a fiber reinforced cement based mixed material containing cement (weight C), a mineral admixture (weight A), water, a chemical admixture, aggregate particles (weight S), and fibers, the aggregate particles contained in the fiber reinforced cement based mixed material in a proportion of 50 to 95% in terms of a weight ratio WR (=S/Y) to a total weight (Y (=C+A)) of the cement and the mineral admixture, wherein at least some of the fibers is formed to be a bumpy fiber having asperities formed in a surface thereof, and a ratio (h/H) of a depth h of each of recessed portions among the asperities of the bumpy fiber to a smallest cross-sectional diameter H thereof is 0.05 to 0.8.

Effects of the Invention

The fiber reinforced cement based mixed material of the present invention formed as described above is a material obtained by combining fibers having high tensile strength to a cement matrix being dense and having ultra high strength. Moreover, at least some of the mixed fibers is formed to be a bumpy fiber having asperities formed in the surface thereof Further, the depth h of each recessed portion among the asperities of the bumpy fiber is defined within a predetermined range.

For this reason, mechanical engagement occurs between the asperities given in the fiber surface and the aggregate particles in the cement matrix. Accordingly, the mechanical bond between each bumpy fiber and the aggregate particles can be increased.

With the mechanical bond increased as described above, the mechanical engagement between the asperities given in the fiber surface and the aggregate particles in the cement matrix generates resisting force against bond shift (slip) of major deformation between the fiber and the cement matrix even if the chemical bond between the fiber surface and the cement matrix is cut. Accordingly, it is possible to maintain sustainable bond. For this reason, even if the width of a crack is increased, the bridging effect of the bumpy fibers covering the tensile force is maintained, thereby making it possible to increase the tensile strength and improve the toughness.

Moreover, a structure built using the fiber reinforced cement based mixed material, which experiences only a small decrease in yield strength even in case of major deformation and exhibits excellent toughness performance, can expect an increase in ultimate strength.

Further, if high toughness can be secured, seismic energy can be absorbed to a significantly greater extent than conventional reinforced concretes. Hence, the fiber reinforced cement based mixed material of the present invention is suitable as a material for aseismic structures.

MODES FOR CARRYING OUT THE INVENTION

Figure 1:
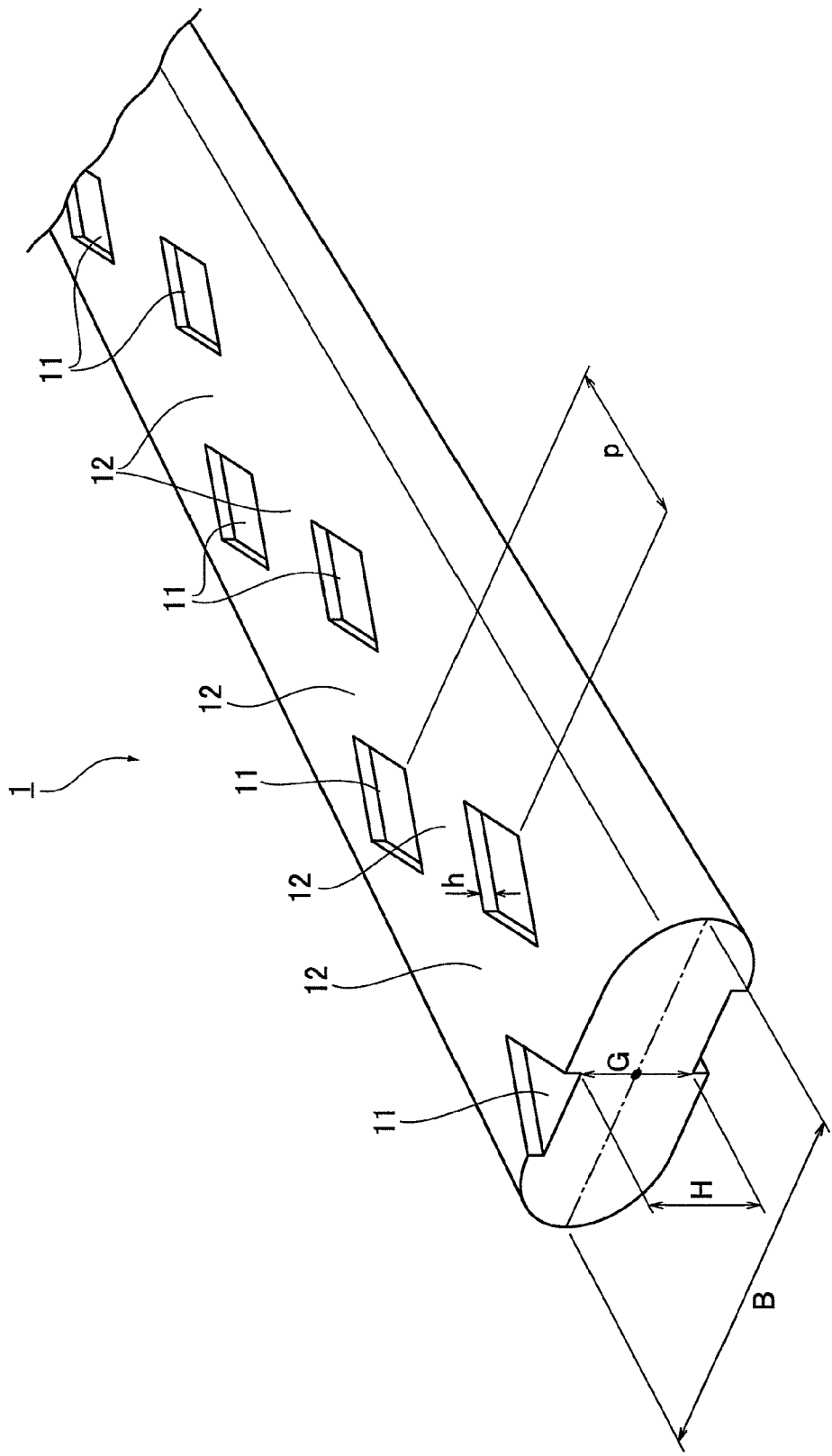
FIG. 1 is a perspective view describing the configuration of a bumpy fiber mixed in a fiber reinforced cement based mixed material of an embodiment of the present invention.

Hereinbelow, embodiments of the present invention will be described with reference to the drawings.

Ultra-high-strength fiber reinforced concrete as a fiber reinforced cement based mixed material of this embodiment contains cement, a mineral admixture, water, a chemical admixture, aggregate particles, and fibers.

Here, for the cement, it is possible to use portland cement (such as ordinary portland cement, high-early-strength portland cement, ultra high-early-strength portland cement, moderate-heat portland cement, low-heat portland cement, sulfate-resistant portland cement, etc).

Moreover, for the mineral admixture, it is possible to use: silica fume; precipitated silica; ground granulated blast furnace slag (ground blast furnace slag); ground air-cooled blast furnace slag; fly ash; classified fly ash; coal gasification fly ash; volcanic ash; diatomaceous earth; clay silicate; trass; an expansive additive; ground limestone; an ettringite-forming admixture such as anhydrite; a polymer dispersion; and redispersible polymer powder obtained therefrom. Here, the mineral admixture refers to a material which chemically reacts in the presence of cement, and the chemical reaction can be categorized roughly into a mutual chemical reaction between the mineral admixture and the compound making up the cement and a chemical reaction of the mineral admixture itself. Moreover, each of these admixtures can be used alone or in combination with others.

Further, the chemical admixture is an additive agent used for a variety of purposes such as improving fluidity and strength development, setting control, and improving durability, and at least one kind is used. For this chemical admixture, it is possible to use a high-range water-reducing agent, an air-entraining and high-range water-reducing agent, a plasticizing agent, an anti-foaming agent, a setting accelerating agent, a setting retarding agent, a thickening agent, a shrinkage reducing agent, a quick setting agent, a foaming agent, a rust-preventive agent, etc., either alone or in combination with others.

Moreover, for the aggregate particles, it is possible to use all those usable as the aggregate of concrete such as crushed sand, river sand, sea sand, silica sand, crushed sand of limestone, sand of a recycled aggregate, a ground product of bauxite, a ground product of an iron ore, and a ground product of a slag.

The aggregate particles are blended in the ultra-high-strength fiber reinforced concrete in such a proportion that a weight ratio WR (=S/Y) of the aggregate particles (weight S) to the total weight (Y(=(C+A)) of the cement (weight C) and the mineral admixture (weight A) is 50 to 95%. Moreover, a mean particle diameter $\phi_A$ of the aggregate particles is preferably 0.2 to 0.8 mm. Here, the mean particle diameter $\phi_A$ of the aggregate particles is a particle size (diameter) in a particle-diameter accumulation curve of the aggregate particles at a weight ratio of 50% in weight percent passing (or passage ratio) and corresponds to what is called a mean particle diameter $D_{50}$.

Moreover, for the fibers mixed in the ultra-high-strength fiber reinforced concrete, it is possible to use: organic fibers (e.g. polypropylene (PP) fibers, polyvinyl alcoholic (PVA) fibers, aramid fibers, polyethylene fibers, ultra-high-strength polyethylene fibers, polyethylene terephthalate (PET) fibers, rayon fibers, nylon fibers, polyvinyl chloride fibers, polyester fibers, acrylic fibers, anti-alkali glass fibers, etc.); inorganic fibers (steel fibers, high-tensile-strength steel fibers, stainless steel fibers, titanium fibers, aluminum fibers, carbon fibers, basalt fibers, mineral fibers, etc.); or the like. Further, the fibers used may not be of only one kind but of a combination of multiple kinds.

The cross-sectional shape of the fibers may be any shape such as the flat elliptical shape shown in FIG. 1, a circular shape, or a rectangular shape. Here, if the area of the cross section is the same, circular cross sections have the smallest bonding area. In contrast, if the area of the cross section is the same, flat cross sections have larger bonding areas than circular cross sections. For this reason, flat elliptical cross sections and rectangular cross sections are advantageous in terms of bonding.

Moreover, the total volume of the fibers to be mixed is preferably 0.7 to 8% of the entire volume. That is, if the fiber mixing ratio is 0.7%, the amount is large enough to expect, though small, a fiber bridging effect for the ultra-high-strength fiber reinforced concrete. However, while a fiber mixing ratio of 8% is an amount with which a sufficient fiber bridging effect can be expected, mixing an amount of fibers equal to or greater than this in the cement matrix makes it impossible to maintain fresh concrete properties in the mixed state and thereby makes self-leveling difficult. This leads to a possibility that the ultra-high-strength fiber reinforced concrete cannot be practically used as a structural material. The total amount of the fibers to be mixed can be more preferably 1.0 to 5.5% of the entire volume.

Further, at least some of the fibers mixed in the ultra-high-strength fiber reinforced concrete is a bumpy fiber 1 having asperities formed in its surface as shown in FIG. 1. This bumpy fiber 1 has multiple recessed portions 11, ... disposed in the fiber surface in a staggered arrangement with a gap therebetween, and a raised portion 12 is between the recessed portions 11, 11. This asperity pattern can be formed by, for example, embossing the fiber surface. Note that the raised portion 12 only needs to protrude from the bottom surfaces of its recessed portions 11; hence, regardless of whether the portion between the recessed portions 11, 11 is flat or raised in a dome shape, it is the raised portion 12.

Figure 2:
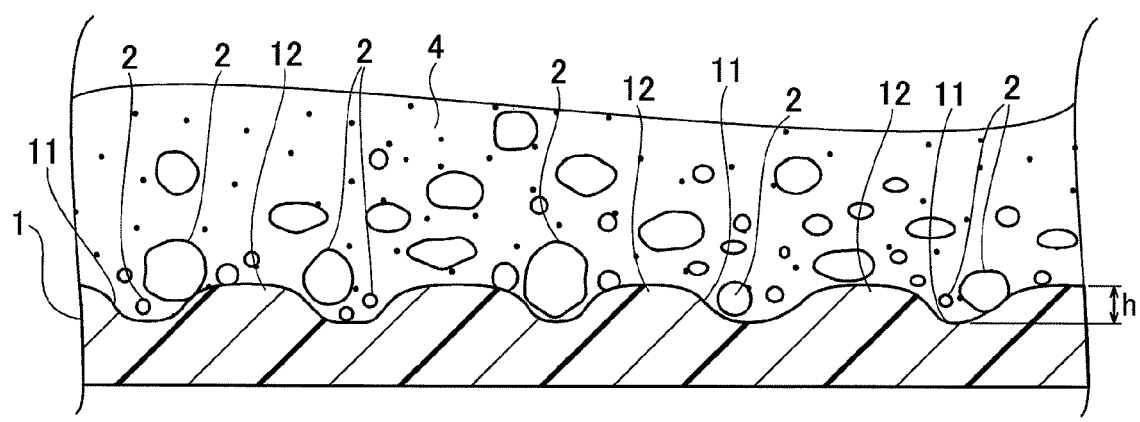
FIG. 2 is an explanatory diagram describing mechanical bond between the bumpy fiber and aggregate particles.

In this embodiment, each recessed portion 11 is formed in a rhombic shape in a plan view having a depth h. Here, the depth h of the recessed portion 11 is the distance from the highest point of its raised portions 12 to the lowest point (bottom surface) of the recessed portion 11 as shown in FIG. 2. Moreover, as shown in FIG. 1, assuming that the center of gravity of a cross section of the bumpy fiber 1 is G, a largest cross-sectional diameter B is the largest diameter passing through the center of gravity G, and a smallest cross-sectional diameter H is the smallest diameter passing through the center of gravity G. Note that in the case where recessed portions 11 are present in the cross section, the smallest cross-sectional diameter H is measured by assuming the bottom surface of each recessed portion 11 as the outer peripheral surface as shown in FIG. 1.

Moreover, the recessed portions 11 among the asperities are each formed such that a ratio h/H of its depth h to the smallest cross-sectional diameter H of the bumpy fiber 1 is 0.05 to 0.8. In addition, a pitch p of the recessed portions 11 among the asperities in the longitudinal direction of the bumpy fiber 1 (the distance between a recessed portion 11 and its adjacent recessed portion 11 in the longitudinal direction) is adjusted such that a ratio p/B of the pitch p to the largest cross-sectional diameter B of the bumpy fiber 1 is 0.3 to 10.0.

Moreover, a mean cross-sectional diameter d of the bumpy fiber 1 is expressed as d=(H+B)/2 as the mean of the smallest cross-sectional diameter H and the largest cross-sectional diameter B. Further, a length Li of each individual bumpy fiber 1 is 1 mm or longer. Furthermore, a ratio (aspect ratio) AR (=Li/d) of the length Li of the bumpy fiber 1 to the mean cross-sectional diameter d is 10 to 500.

Next, operation of the ultra-high-strength fiber reinforced concrete of this embodiment will be described.

The ultra-high-strength fiber reinforced concrete of this embodiment formed as above is a material obtained by combining fibers having high tensile strength to a cement matrix being dense and having ultra high strength.

In the ultra-high-strength fiber reinforced concrete of this embodiment, the asperity pattern of the mixed bumpy fibers 1, the mean particle diameter of the aggregate particles blended to the cement matrix, and the blended weight ratio WR (=S/Y) of the aggregate particles, increase significantly the bond resisting force between the fibers and the cement matrix.

Moreover, through flexural toughness tests to be described in Example 2, it was confirmed that the ultra-high-strength fiber reinforced concrete of this embodiment showed significantly high tensile strength and toughness values.

Now, a mechanism that increases the bonding force of the ultra-high-strength fiber reinforced concrete of this embodiment will be described with reference to FIG. 2. FIG. 2 is a view schematically illustrating an enlarged cross section of the upper half of a bumpy fiber 1, as well as aggregate particles 2, . . . , and a cement hydrate 4 contained in a cement matrix. As shown in FIG. 2, the aggregate particles 2, . . . are dispersed within the cement matrix formed along the recessed portions 11 and the raised portions 12 of the bumpy fiber 1. Some of the aggregate particles 2, . . . are inside the recessed portions 11 of the bumpy fiber 1.

Now, when cracking or the like occurs in a structure built with the ultra-high-strength fiber reinforced concrete, thereby causing a bridging effect and therefore exerting tensile force on the bumpy fiber 1, the cement matrix containing the aggregate particles 2, . . . filled in the recessed portions 11 serve as anchors against the bumpy fiber 1. On the other hand, the raised portions 12 between the recessed portions 11, 11 in the bumpy fiber 1 serve as anchors against the cement matrix.

As described above, the cement matrix of the ultra-high-strength fiber reinforced concrete of this embodiment contains the aggregate particles 2, . . . of appropriate sizes by an appropriate amount. Hence, the mutual shear transfer resistance inside the cement matrix is increased by the engagement of the aggregate particles 2, . . . as compared to conventional ultra-high-strength fiber reinforced concretes.

In addition to that, some of the aggregate particles 2, . . . contained in the above-mentioned anchor formed by the cement matrix engage with the recessed portions 11 of the bumpy fiber 1 as shown in FIG. 2. Thus, it is possible to exert high slip rigidity and high slip shear resisting force against slip shear force generated around the recessed portions 11 due to the bridging effect of the bumpy fiber 1.

The main reason for this may be considered to be that the blended aggregate particles are generally high in elastic modulus and compressive strength and therefore can be expected to have high slip rigidity and high slip shear resisting force, as compared to the cement hydrate 4 in the cement matrix without the aggregate particles therein.

Moreover, for the ultra-high-strength fiber reinforced concrete of this embodiment, parameters regarding the asperity pattern on the surface of the bumpy fiber 1, and the mixing amount of the aggregate particles are defined.

The weight ratio WR (=S/Y) for the mixing amount of the aggregate particles is preferably 50 to 95%. To describe this with reference to FIG. 2, if WR is below 50%, the amount of the aggregate particles 2 contained in the cement matrix in the recessed portions 11 of the bumpy fiber 1 is too small, thereby reducing the probability of the aggregate particles 2 engaging with the recessed portions 11. As a result, it becomes impossible to expect high slip rigidity and high slip shear resisting force against slip shear force generated around the recessed portions 11. On the other hand, if the weight ratio WR is over 95%, powder materials (=cement+mineral admixture) (binding material) in the cement matrix are greatly reduced, it is difficult to achieve necessary mechanical characteristic values, such as compressive strength and tensile strength, of the ultra-high-strength fiber reinforced concrete itself. That is, the proportion of the cement matrix surrounding the aggregate particles 2 decreases. Thus, even if the aggregate particles 2 are hooked on the recessed portions 11, the surrounding cement hydrate 4 cannot sufficiently transfer slipping force from the aggregate particles 2. As a consequence, it becomes impossible to expect high slip rigidity and high slip shear resistance. The weight ratio WR (=S/Y) for the mixing amount of the aggregate particles is more preferably 55 to 95%.

For the depth h of each recessed portion 11 of the bumpy fiber 1, the ratio h/H thereof to the smallest cross-sectional diameter H of the bumpy fiber 1 is set as a parameter, by taking into account the bonding interaction between the aggregate particles 2 in the cement matrix and the bumpy fiber 1. Reducing the ratio h/H reduces the depth h of the recessed portion 11 and thereby imparts a decreasing tendency to the mechanical bond.

On the other hand, increasing the ratio h/H increases the mechanical bond but increases the size of the loss of the bumpy fiber 1 in its cross sections. This reduces the tensile strength of the bumpy fiber 1 itself and the rigidity of the fiber. Thus, it is possible that the risk of the bumpy fiber 1 breaking before slip shear fracture of the cement matrix may be increased, and that the reduced tensile rigidity of the fiber may increase the width of cracks.

In this respect, the ratio h/H is set within the range of 0.05 to 0.8. In this way, a significant improvement can be expected in the mechanical bond produced by an appropriate amount of aggregate particles engaging with the recessed portions and the raised portions of the bumpy fiber 1. Moreover, the possibility of breakage of the fiber and decrease in the rigidity of the fiber can be minimized.

If the ratio h/H is below 0.05, the relative depth of the recessed portion 11 in the bumpy fiber 1 is small. For this reason, even in the case of a combination in which the mean particle diameter $\phi_A$ of the aggregate particles 2 is small, the aggregate particles 2 in the recessed portions 11 of the bumpy fiber 1 are too large, thus reducing the probability of valid engagement between the aggregate particles 2 and the recessed portions 11. High slip shear rigidity and high slip shear resistance cannot be expected. On the other hand, if the ratio h/H is over 0.8, its effect on the engagement with the aggregate particles 2 is considered to increase. However, the loss of the bumpy fiber 1 in its cross sections increases, thereby increasing the risk that the bumpy fiber 1 may break at its cross sections around the recessed portions 11 of the bumpy fiber 1 before increase of the mechanical bond by slip shear force through the aggregate particles 2. Moreover, increasing the loss of the bumpy fiber 1 in its cross sections reduces the tensile rigidity of the bumpy fiber 1. Thus, even if the mechanical bond between the bumpy fiber 1 and the cement matrix is sufficient, stretching deformation of the fiber itself leads to an increase in the width of cracks in the cement matrix. Consequently, an object of achieving a fiber reinforcing effect cannot be fulfilled. The parameter of the ratio h/H for the depth h of each recessed portion 11 of the bumpy fiber 1 is more preferably within a range of 0.05 to 0.5.

The mean particle diameter $\phi_A$ of the aggregate particles 2 is preferably within a range of 0.2 to 0.8 mm. If the mean particle diameter $\phi_A$ of the aggregate particles 2 is below 0.2 mm, the aggregate particles 2 in the recessed portions 11 of the bumpy fiber 1 are too small, thus reducing the probability of the aggregate particles 2 directly engaging with the recessed portions 11. As a result, the effects of high slip rigidity and high slip shear resistance around the recessed portions 11 of the bumpy fiber 1 are reduced. Moreover, in the case where the mean particle diameter $\phi_A$ is small, the slip shear resisting force of a single aggregate particle 2 decreases in proportion to the square of the diameter. However, in the case where the mean particle diameter $\phi_A$ is large, the opposite is found—the slip shear resisting force increases in proportion to the square of the diameter. On the other hand, if the mean particle diameter $\phi_A$ is over 0.8 mm, the slip shear resisting force of a single aggregate particle 2 increases, but the aggregate particles 2 in the recessed portions 11 of the bumpy fiber 1 are too large, thus reducing the probability of the aggregate particles 2 directly engaging with the recessed portions 11. As a consequence, the high slip shear rigidity and high slip shear resistance decrease. In other words, by setting the mean particle diameter $\phi_A$ of the aggregate particles 2 to 0.2 to 0.8 mm, it is possible to increase the probability of the aggregate particles 2 engaging with the recessed portions 11 and the raised portions 12 of the bumpy fiber 1. The mean particle diameter $\phi_A$ of the aggregate particles 2 is more preferably within a range of 0.2 to 0.6 mm.

Moreover, for the pitch p of the asperities in the longitudinal direction of the bumpy fiber 1, the ratio p/B thereof to the largest cross-sectional diameter B of the bumpy fiber 1 is set to 0.3 to 10.0. If the ratio p/B is below 0.3, the pitch p of the asperities in the longitudinal direction is short, i.e., the length of each raised portion 12 is short. As a result, the resistance length of each anchor of the bumpy fiber 1 mentioned above decreases. This leads to a decrease in the slip shear rigidity and a decrease in the slip shear yield strength of each raised portion 12 of the bumpy fiber 1 against slip shear force generated between the bumpy fiber 1 and the cement matrix. The decrease in the slip shear rigidity leads to an increase in the width of cracks in the ultra-high-strength fiber reinforced concrete and a decrease in the toughness thereof. Moreover, the decrease in the slip shear yield strength leads to a decrease in the tensile strength of the ultra-high-strength fiber reinforced concrete.

On the other hand, if the ratio p/B is over 10.0, the above problem is improved, but the number of the recessed portions 11, . . . of the bumpy fiber 1 decreases, thereby reducing the number of the anchors of the cement matrix mentioned above. Accordingly, the risk of slip shear fracture of the cement matrix is increased, and the slip shear resisting force, i.e. the mechanical bond is reduced as a whole.

In this respect, the ratio p/B is set to 0.3 to 10.0. In this way, the anchors of the cement matrix and the anchors of the bumpy fiber 1 are disposed in a well-balanced arrangement. Accordingly, even when major slip shear displacement (debonding) occurs, a large decrease in bond resisting force that would be caused by an unbalanced arrangement of the bonding mechanisms does not occur. The ratio p/B for the pitch p of the recessed portions 11 among the asperities in the longitudinal direction of the bumpy fiber 1 is more preferably within a range of 0.5 to 7.0.

As described above, in the ultra-high-strength fiber reinforced concrete of this embodiment, the bumpy fibers 1 each of which has, on its fiber surface, an asperity pattern defined within a given range are mixed, or combined, to a cement matrix in which aggregate particles is blended by a blending weight defined within a given range. Thus, it is possible to achieve a bonding effect between the bumpy fibers 1 and the cement matrix which can never be achieved on its own individually, and a bridging effect as fiber reinforced concrete. Specifically, synergy of the combination of the asperity pattern of each bumpy fiber 1 and the blended weight of the aggregate particles makes it possible to achieve high tensile strength and high toughness after development of a crack which cannot be achieved by conventional ultra-high-strength fiber reinforced concretes.

Moreover, the aspect ratio AR (=Li/d), which is the ratio of the length Li of each fiber mixed in the ultra-high-strength fiber reinforced concrete containing the bumpy fibers 1 to the mean cross-sectional diameter d, is a condition for the fiber and the cement matrix to satisfy the minimum bond. By setting the ratio AR (=Li/d) to 10 to 500, it is possible to secure sufficient bond when the ratio AR is combined with the aggregate particles of this embodiment.

If the ratio AR is below 10, the bonding area is too small to secure sufficient bonding performance even in the case where the condition for the combination of the asperity pattern of each bumpy fiber 1 and the mean particle diameter $\phi_A$ and the blended weight of the aggregate particles 2 is satisfied. On the other hand, if the ratio AR is over 500, sufficient bonding performance can be secured between the bumpy fiber 1 and the cement matrix. However, because the fiber length is too large, the fibers may be tangled when mixed into the cement matrix, thereby drastically increasing the risk of forming fiber balls. This makes it difficult to evenly disperse the fibers inside the cement matrix. Accordingly, the fibers cannot fulfill their function as the ultra-high-strength fiber reinforced concrete. The aspect ratio AR of the ultra-high-strength fiber reinforced concrete of this embodiment ranges depending upon the material of the fibers and the fluidity performance of the cement matrix. However, the bonding performance can be improved. Thus, as compared to conventional ultra-high-strength fiber reinforced concretes, the aspect ratio AR can be set small, and the mixing amount of the bumpy fibers 1 can be increased. The aspect ratio AR (=Li/d) can be set more preferably to 15 to 300.

Further, a ratio DR (=Lm/Dmax) of a mean length Lm of the bumpy fibers 1 to a largest particle diameter Dmax of the aggregate particles 2 is the length of the bumpy fibers 1 with respect to the largest aggregate particle diameter of the aggregate particles 2. The ratio DR is set to 2 to 20. Here, the largest particle diameter Dmax of the aggregate particles 2 is the smallest value among the particle sizes (diameters) in a particle-diameter accumulation curve of the aggregate particles 2 at a weight ratio of 100% in weight percent passing (or passage ratio).

If the ratio DR is below 2, the mean length Lm of the bumpy fibers 1 is below twice the largest particle diameter Dmax, and a bridging effect by the fibers around the aggregate cannot therefore be expected. This is because the aggregate particles 2 are generally higher in strength and rigidity than the cement matrix, and the matrix in the cement matrix around the aggregate particles 2 is peeled off easily. On the other hand, if the ratio DR is over 20, a sufficient bridging effect by the fibers can be expected. However, because the fiber length is too large, the fibers may be tangled when mixed into the cement matrix, thereby drastically increasing the risk of forming fiber balls. Accordingly, the fibers cannot fulfill their function as the ultra-high-strength fiber reinforced concrete. The ratio DR (=Lm/Dmax) of the mean length Lm of the bumpy fibers 1 to the largest particle diameter Dmax of the aggregate particles 2 can be set more preferably to 4 to 20.

By controlling the mixing amount of fibers as described above, it is possible to obtain ultra-high-strength fiber reinforced concrete whose fiber dispersion properties and fresh concrete properties are adjusted to desired properties. Further, it is possible to adjust the fiber dispersion properties and the fresh concrete properties such as fluidity to desired properties also by controlling the length and diameter of the bumpy fibers 1.

Example 1

Hereinbelow, this Example 1 will describe an embodiment different from the above-described embodiment with reference to FIGS. 3 to 7. Note that the description will be provided by giving the same reference numerals to portions that are the same as or equivalent to the contents described in the above embodiment.

This Example 1 will describe various types of bumpy fibers 1A to 1E. The cross-sectional shape of each of the bumpy fibers 1A to 1E may be any shape such as a circular shape, an elliptical shape, a squeezed round shape, a rectangular shape, or any other polygonal shape.

Moreover, while embossing is common for the method of forming the asperity pattern, the method is not limited thereto and may be any working method such as cutting or folding. Further, although the asperity pattern is provided on, for example, two facing surfaces (the upper surface and the lower surface) of each fiber, the following will mainly describe the asperity pattern provided on the upper surface of the fiber.

Moreover, as will be described later, the shapes of recessed portions 11A to 11E, 13A, 13B are not limited and may be any shape such as a rhombic shape, a triangular shape, a circular shape, an elliptical shape, some other polygonal shape, or a slit shape in a plan view. Moreover, the recessed portions may be not only those with a flatly formed bottom surface but also those with an inclined bottom surface formed in a mortar shape, a pyramid shape, or the like.

Figure 3:
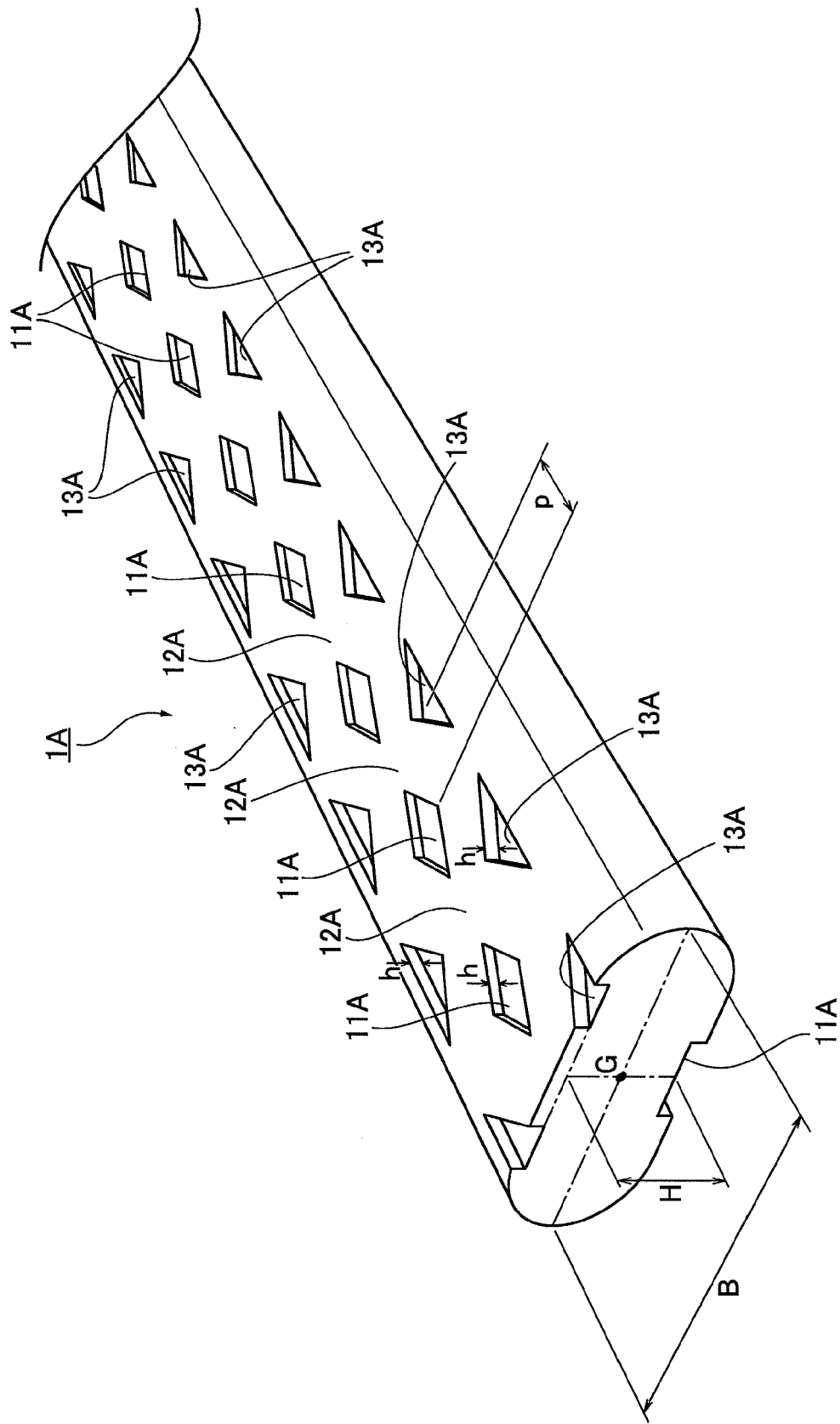
FIG. 3 is a perspective view showing the configuration of a bumpy fiber described in Example 1.

First, a bumpy fiber 1A shown in FIG. 3 is the same as the bumpy fiber 1 described the above embodiment in that it has a flat elliptical cross section. Moreover, recessed portions 11A, ... of a rhombic shape in the plan view are formed at the center of the surface of the bumpy fiber 1A in a line at given intervals in the longitudinal direction. Further, recessed portions 13A, ... in the shape of an isosceles triangle are formed in a line on both sides of where the recessed portions 11A, ... are formed.

These two types of recessed portions 11A, 13A have the same depth h. Moreover, a pitch p between the recessed portions 11A, 13A across a raised portion 12A of the bumpy fiber 1A is the distance between a recessed portion 11A and its adjacent recessed portion 13A in the longitudinal direction as shown in FIG. 3.

Moreover, as shown by the cross section in FIG. 3, the bumpy fiber 1A is such that the positions of the recessed portions 11A at the center of the lower surface are not aligned with the positions of the recessed portions 13A on the side portions of the upper surface. Thus, a smallest cross-sectional diameter H is a value found by subtracting the depths of the recessed portion 11A and recessed portion 13A (h+h) from the thickness of the bumpy fiber 1A.

Figure 4:
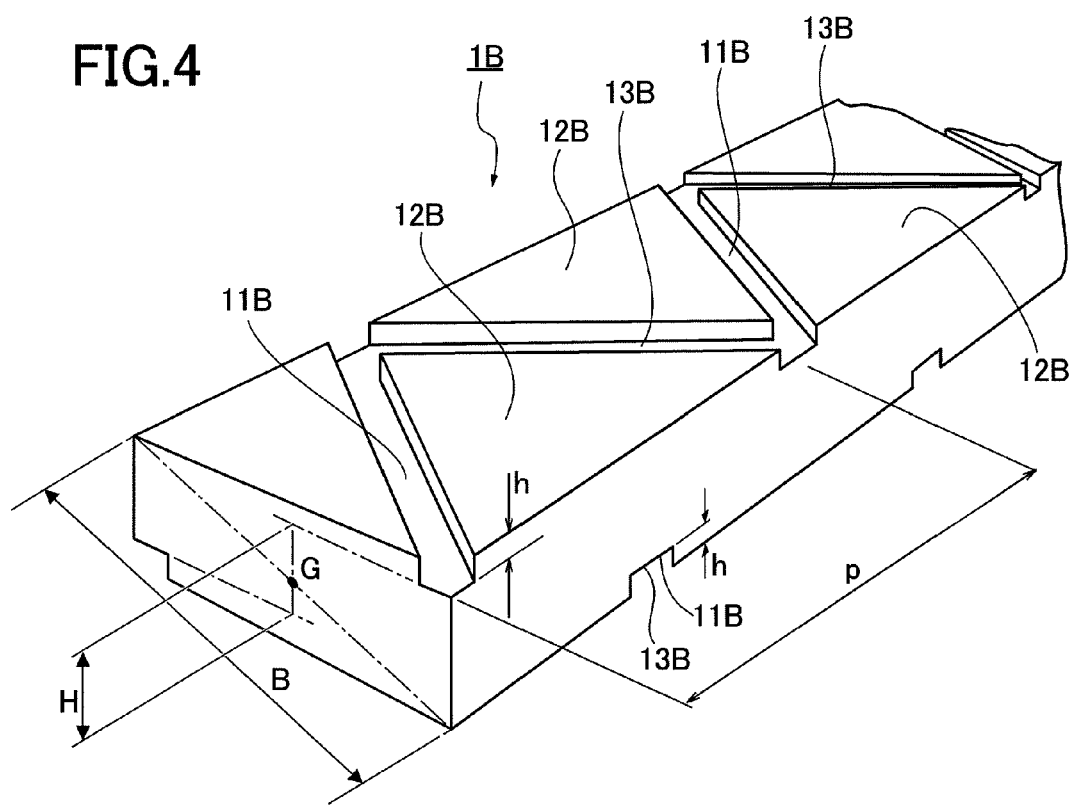
FIG. 4 is a perspective view showing the configuration of another bumpy fiber described in Example 1.

Meanwhile, a bumpy fiber 1B shown in FIG. 4 has a rectangular cross section, and straightly extending recessed portions 11B, 13B, ... are formed in the fiber surface in a wave pattern. Note that the recessed portions 11B, 13B may not extend straightly but in a curved or continuous sinusoidal shape.

Moreover, the recessed portions 11B, 13B are formed by embossing or cutting into a rectangular shape in cross section having a depth h. Note that the cross sections of the recessed portions 11B, 13B are not limited to a rectangular shape and may be a semicircular shape, an inverted triangular shape, or the like.

Each recessed portion 11B is a groove inclining in a first direction and traversing the fiber surface, whereas each recessed portion 13B is a groove inclining from an end of the recessed portion 11B in the direction opposite to the first direction and traversing the fiber surface. Moreover, a raised portion 12B in the shape of an isosceles triangle in a plan view is formed between the recessed portion 11B and the recessed portion 13B.

A pitch p of the recessed portions 11B, 13B among the asperities of the bumpy fiber 1B is the distance in the longitudinal direction between an end of the recessed portion 11B and the end of the recessed portion 13B on the same side as shown in FIG. 4. Moreover, as shown by the cross section in FIG. 4, a largest cross-sectional diameter B of the bumpy fiber 1B is the greatest diagonal length of a cross section passing through a center of gravity G. Furthermore, a smallest cross-sectional diameter H is a value found by subtracting the depths of the recessed portion 11B in the upper surface and the recessed portion 13B in the lower surface (h+h) from the length of each short side of a rectangle passing through the center of gravity G.

Figure 5:
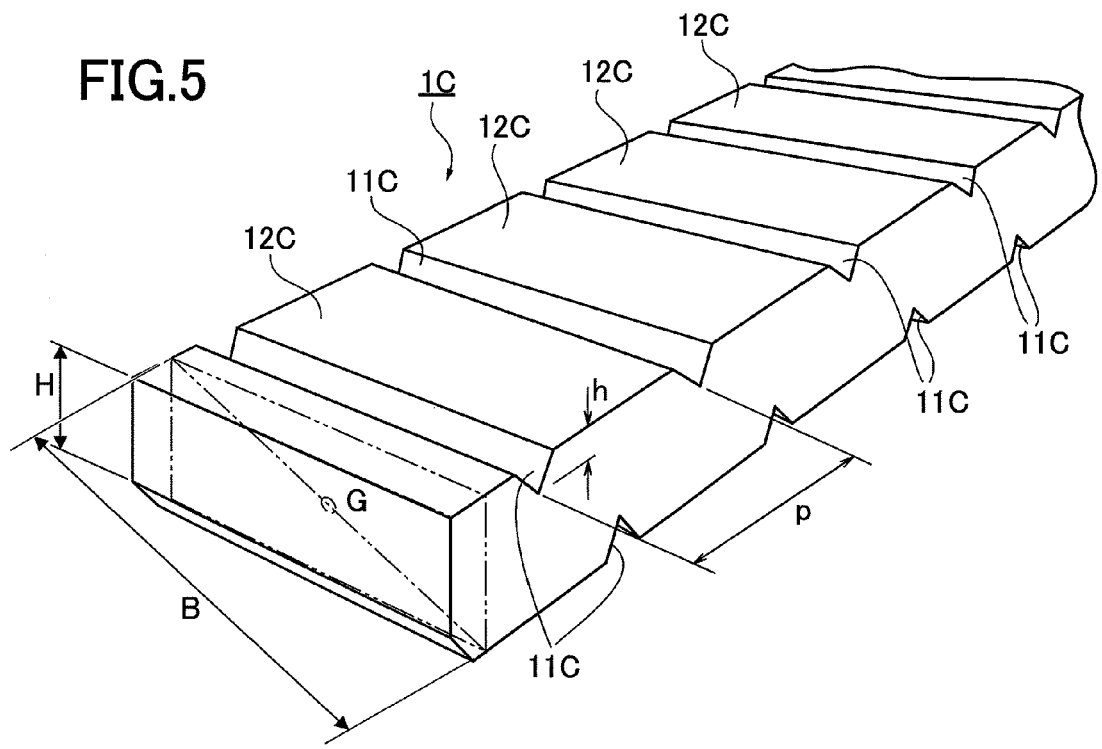
FIG. 5 is a perspective view showing the configuration of another bumpy fiber described in Example 1.

Moreover, a bumpy fiber 1C shown in FIG. 5 has a rectangular cross section, and recessed portions 11C, ... straightly extending and traversing the fiber surface are formed at given intervals in the longitudinal direction. Note that each recessed portion 11C may not extend straightly but in a curved shape or a wave pattern.

Further, the recessed portion 11C is formed by embossing or cutting into an inverted triangle shape in cross section having a depth (height) h. Note that the cross section of the recessed portion 11C is not limited to an inverted rectangular shape and may be a semicircular shape, a rectangular shape, or the like.

Moreover, a pitch p of the recessed portions 11C among the asperities of the bumpy fiber 1C is the distance between the valleys of the recessed portions 11C, 11C as shown in FIG. 5. Moreover, a raised portion 12C of a rectangular shape in a plan view is formed between the recessed portions 11C, 11C.

Moreover, a largest cross-sectional diameter B of the bumpy fiber 1C is the diagonal length of a rectangle passing through a center of gravity G at a position where no recessed portion 11C is present in the cross section, as shown in FIG. 5. Furthermore, because the positions of the recessed portions 11C in the upper surface and the positions of the recessed portions 11C in the lower surface are not aligned with each other, a smallest cross-sectional diameter H is a value found by subtracting the depth h of each recessed portion 11C from the thickness of the bumpy fiber 1C.

Figure 6:
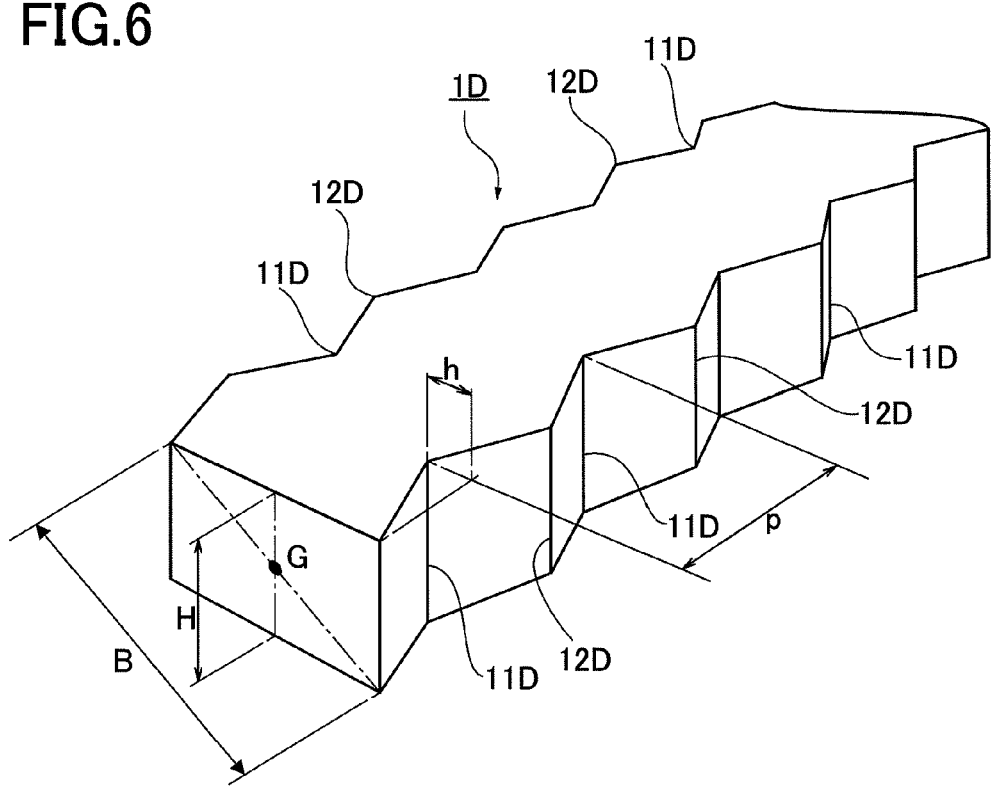
FIG. 6 is a perspective view showing the configuration of another bumpy fiber described in Example 1.

Next, a bumpy fiber 1D shown in FIG. 6 has a rectangular cross section, and each diagonal line of the rectangle measures a largest cross-sectional diameter B while each short side thereof measures a smallest cross-sectional diameter H. Recessed portions 11D and raised portions 12D are alternately formed in a saw-tooth shape on both side surfaces of the fiber. Moreover, the positions of the recessed and raised portions are not aligned between both side surfaces of the fiber; when there is a recessed portion 11D formed on one side surface, a raised portion 12D is formed at the opposite position on the other side surface. Thus, the cross-sectional area of the bumpy fiber 1D remains always constant along the longitudinal direction thereof. Note that this saw-tooth shape may not be formed by flat surfaces, and may be formed by a curved surface.

Further, each recessed portion 11D is formed by cutting or folding into a triangular shape in a plan view having a depth h. Note that in the case where the recessed portion 11D is formed by a curved surface, it has a dome shape in the plan view.

Moreover, a pitch p of the recessed portions 11D among the asperities of the bumpy fiber 1D is the distance between the valleys of the recessed portions 11D, 11D as shown in FIG. 6. Moreover, the raised portion 12D in the shape of an isosceles triangle in the plan view is formed between the recessed portions 11D, 11D.

Figure 7:
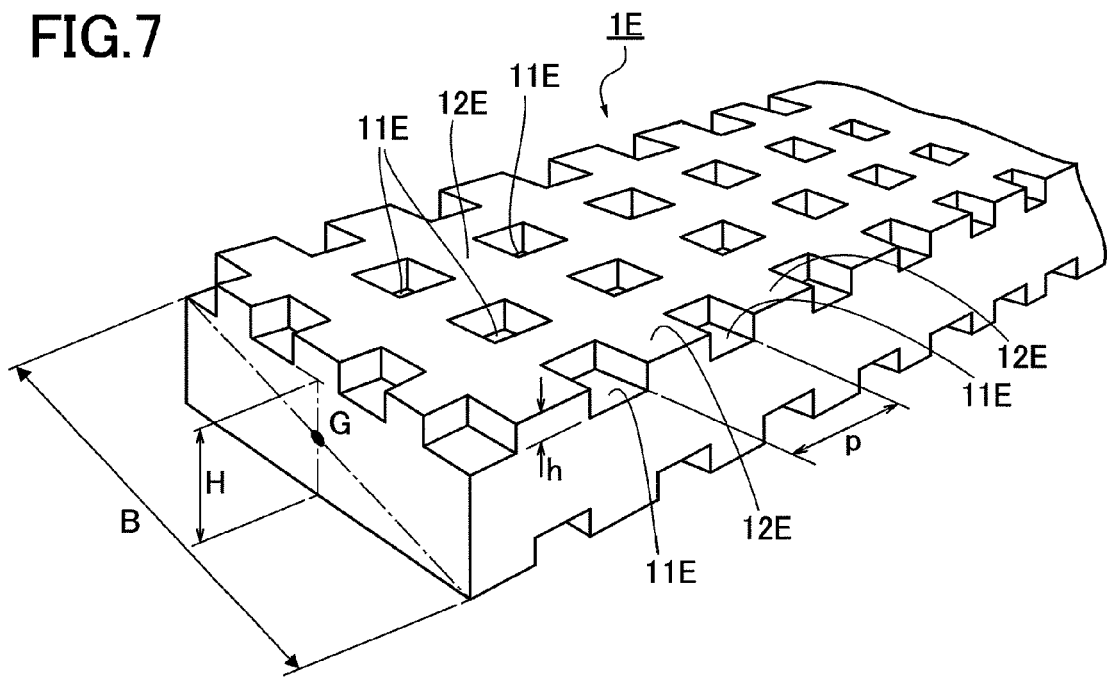
FIG. 7 is a perspective view showing the configuration of another bumpy fiber described in Example 1.

Further, a bumpy fiber 1E shown in FIG. 7 has a rectangular cross section, and multiple recessed portions 11E, . . . in the shape of a square column are formed in the fiber surface at constant intervals in the longitudinal direction and in the width direction in a checkered pattern. Note that each recessed portion 11E may not be in the shape of a square column and may be in the shape of a circular column or in the shape of any other polygonal column.

Further, each recessed portion 11E is formed by embossing or cutting to a constant depth h. Note that the recessed portion 11E may not be in a columnar shape having the constant depth h, and may be in a mortar shape, a pyramid shape, or the like.

Moreover, a pitch p of the recessed portions 11E among the asperities of the bumpy fiber 1E is the distance between a recessed portion 11E and its adjacent recessed portion 11E in the longitudinal direction as shown in FIG. 7. Moreover, a raised portion 12E in a rectangular shape in a plan view is formed between the recessed portions 11E, 11E. Note that the recessed portions 11E, . . . may not be arranged in a checkered pattern and may be in a staggered pattern.

Moreover, as shown by the cross section in FIG. 7, a largest cross-sectional diameter B of the bumpy fiber 1E is the greatest diagonal length of a cross section passing through a center of gravity G. Furthermore, because the positions of the recessed portions 11E in the upper surface and the positions of the recessed portions 11E in the lower surface are not aligned with each other, a smallest cross-sectional diameter H is a value found by subtracting the depth h of each recessed portion 11E from the thickness of the bumpy fiber 1E.

Note that the operations and effects of the other components are substantially the same as the above embodiment, and description thereof is therefore omitted.

Example 2

Hereinbelow, this Example 2 will describe the results of tests performed to confirm performance of the ultra-high-strength fiber reinforced concretes described in the embodiment and in Example 1 discussed above. Note that the description will be provided by giving the same reference numerals to portions that are the same as or equivalent to the contents described in the above embodiment and Example 1.

As will be described below, the mechanical characteristics of the ultra-high-strength fiber reinforced concretes described above are such that the strength characteristics range to some extent depending upon the material and the surface pattern of each of the bumpy fibers 1, 1A to 1E to be mixed, even when cement matrices of the same blending proportion are used.

Specifically, the ultra-high-strength fiber reinforced concrete of the embodiment has the following mechanical characteristics: a compressive strength (the result of a test using a specimen in the shape of a circular column measuring $\phi 10 \times 20$ cm) of 100 to 250 $N/mm^2$; a flexural tensile strength (the result of a test using a flexural specimen measuring $4 \times 4 \times 16$ cm) of 20 to 80 $N/mm^2$; a tensile strength of initial occurrence of a crack (the result of a split test using a specimen in the shape of a circular column measuring $\phi 10 \times 20$ cm) of 5 to 20 $N/mm^2$; and a fracture energy against flexural tension of 5 to 150 N/mm.

Moreover, as for the blending proportion of the cement matrix, the water-cement ratio is 20 to 26%, which is extremely small, and a closest packing technique is employed for blending the mineral admixture and the aggregate particles other than the cement. Thus, obtained is a dense hydration reaction product which is a material that can maintain its durability on the order of 100 years.

Here, the closest packing technique refers to a technique to find the grading distribution and the blending volume (weight) of each material to be blended into the cement matrix so that the material will have the maximum density. In other words, it is a technique to pack (fill) the material at the maximum density. For example, by blending a mineral admixture such as silica fume or ground blast furnace slag of a smaller particle diameter than the cement particles, these fine particles are packed between the cement particles, thereby increasing the density.

Then, closest packing as described above obviously makes the cement matrix a highly dense structure, and the pore structure thereof is known to become such that capillary pores are reduced and changed to gel pores. For this reason, the durability is significantly improved. To express this durability in numeral values, the chloride irons diffusion coefficient is $1.0 \times 10^{-3}$-$5.0 \times 10^{-3}$ $cm^2$/year, and the water permeability coefficient is $2 \times 10^{-17}$-$8 \times 10^{-17}$ cm/sec. Moreover, no decrease is observed in relative dynamic modulus of elasticity even after more than 500 freezing-thawing cycles in a freezing-thawing test (the underwater freezing-thawing test in JIS A 1148). Further, as for resistance against carbonation, the carbonation depth after 500 years is 2 mm or smaller, indicating such a characteristic that no verification is needed for the carbonation.

Moreover, from the cement matrix subjected to the blending through the closest packing, a filler effect and a bearing effect can be expected by the proportion of a mineral admixture with a smaller particle diameter than the cement particles, and the aggregate proportion of the aggregate particles 2 subjected to grading adjustment. Accordingly, the fluidity of the cement matrix is significantly increased. Further, because a high-range water-reducing agent or the like is employed as the chemical admixture, self-leveling can be achieved even with a small water-cement ratio (W/C ratio). For example, the flow value measured by JIS R5201 flow test (without dropping) is 25±3 cm, and the consistency after mixing therefore has sufficient self-leveling. Accordingly, compaction with a vibrator is unnecessary, and sufficiently dense concrete can be obtained only by casting.

[Bond Resistance Tests]

The tensile characteristics of the ultra-high-strength fiber reinforced concrete of the embodiment or Example 1 may be influenced by factors such as (1) the cracking strength of the cement matrix, (2) the tensile strength (bond strength) of the cement matrix, (3) the tensile rigidity of each fiber to be mixed for reinforcement including the bumpy fibers 1, 1A to 1E, (4) the tensile strength of the fiber, and (5) the bond strength between the fiber and the cement matrix.

As for (1) to (4) among these factors, characteristics of the material of the cement matrix and the material of the fiber directly affect the result. As for (5) "the bond strength between the fiber and the cement matrix," how the individual materials are combined is considered to be influential, which has lead to the present invention. Now, the following will describe in detail bond resistance tests performed to prove performance of ultra-high-strength fiber reinforced concrete of one embodiment of the present invention.

laser displacement meter 33 was placed directly below the reflection plate 32, and the displaced amount of the reflection plate 32 emitting a laser ray was measured. Furthermore, the pulling load on the bumpy fiber 1 was measured along with the measurement of the pulled amount of the bumpy fiber 1.

Here, the speed of the Instron tester pulling up the upper end of the bumpy fiber 1 was set to 1.0 mm/min. Moreover, because it was difficult for a metal-made air chuck 34 to directly hold the bumpy fiber 1 when pulling up the tip of the bumpy fiber 1, the periphery of the upper end of the bumpy fiber 1 was reinforced with epoxy resin to thereby form a grip portion 31, and this grip portion 31 was sandwiched in the air chuck 34 and subjected to a pulling load.

[Specifications of Examples]

Table 1 shows specifications including characteristics of the cement matrices used in the bond resistance tests and the like.

TABLE 1

| Cement Matrix | Mean Particle Diameter $\Phi_A$ of Aggregate Particles (mm) | Aggregate/(Cement + Mineral Admixture)S/ (C + A)(%) | Compressive Strength $\sigma_c$ (N/mm$^2$) | Flexural Strength $\sigma_b$ (N/mm$^2$) |
|---|---|---|---|---|
| Example m-1 | 0.39 | 58 | 206 | 22.3 |
| Example m-2 | 0.42 | 90 | 188 | 22.6 |
| Comparative Example m-1 | 0.15 | 49 | 216 | 23.8 |

[Testing Method for Bond Resistance Tests]

Figure 8:
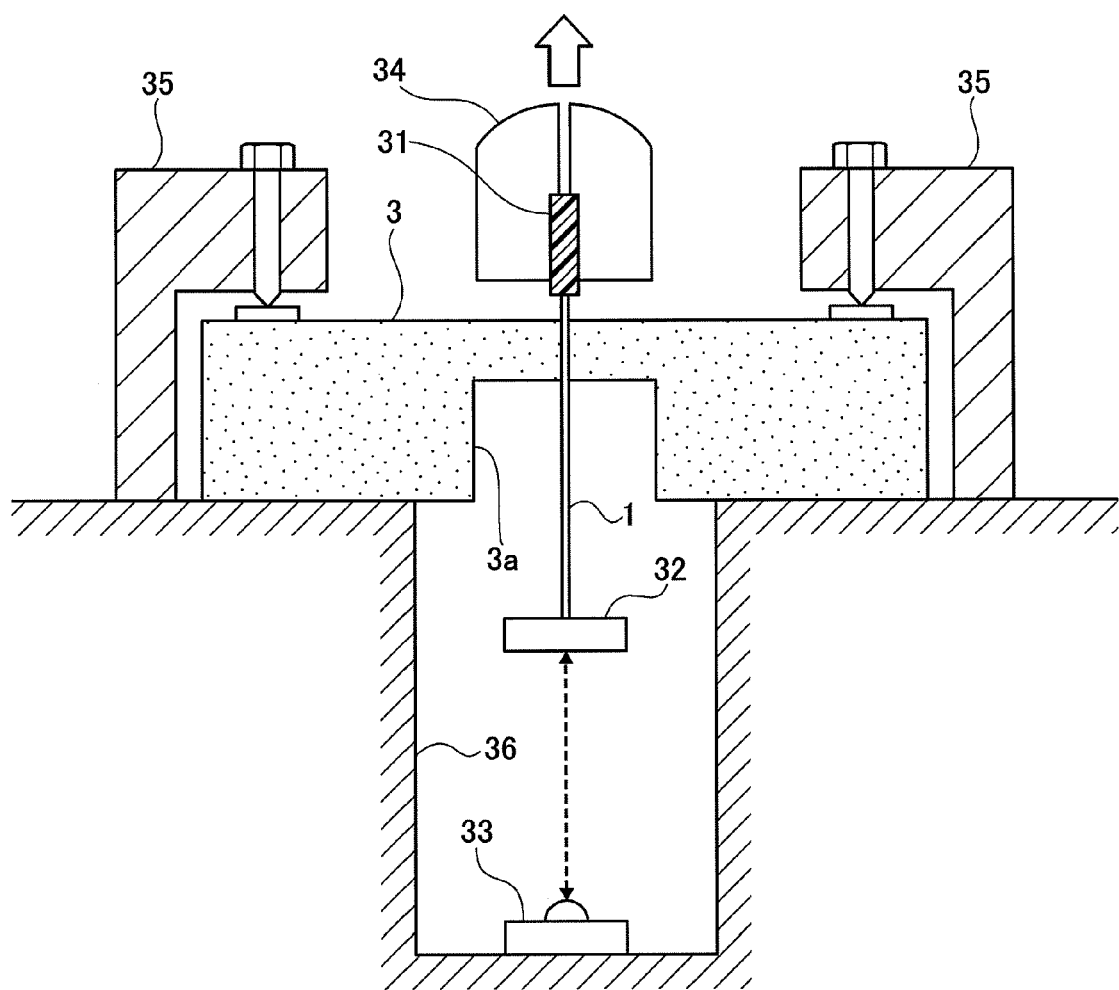
FIG. 8 is a cross-sectional view describing bond resistance tests in Example 2.

To examine the bond resistance between the cement matrix and the bumpy fibers 1, 1A to 1E (hereinbelow, the description will be given by representatively using reference numeral "1"), a cement matrix specimen 3 in which a target bumpy fiber 1 is buried as shown in FIG. 8 was prepared, and a fiber pulling load test was performed.

This specimen 3 was a cuboid of 12 cm×12 cm×2 cm and was prepared such that a tubular portion 3a of φ20 mm was provided in a bottom portion of the cuboid to make a center portion thereof measure 6 mm in thickness, and the bumpy fiber 1 was vertically buried in the center thereof.

Then, after the cement matrix specimen 3 with the bumpy fiber 1 buried therein was thermally cured in a predetermined temperature environment for a predetermined period of time, both ends of the specimen 3 were fixed to fixtures 35, 35 of a load tester (this test used an Instron tester), and pulling load was applied to the bumpy fiber 1 protruding from the upper side of the specimen 3. Thus, the bonding length of this bumpy fiber 1 is 6 mm (the thickness of the center portion of the specimen 3 above the tubular portion 3a) in all the test examples to be described below.

Moreover, to measure to the pulled amount of the bumpy fiber 1, a measurement hole 36 was provided directly below the tubular portion 3a, and a reflection plate 32 was attached as a target to the lower end of the bumpy fiber 1 hanging down in the measurement hole 36 as shown in FIG. 8. Moreover, a The strength characteristics of each cement matrix shown in this Table 1 are observed in a state after performing thermal curing at 90° C. for 30 hours to develop the strength to 100%. That is, after the thermal curing, there is no increasing tendency in strength, and there is no shrinkage due to drying shrinkage either.

The compressive strength shown in Table 1 is the compressive strength of cement matrices each using a specimen in the shape of a circular column measuring φ5×10 cm with no fiber mixed therein. Likewise, the flexural strength is flexural strength found through a flexural strength test (JIS A 1106) on specimens each in the shape of a square column measuring 4×4×16 cm prepared using a cement matrix with no fiber mixed therein. This flexural strength shows a strong correlation with the tensile strength of the cement matrix.

Each of the compressive strengths and the flexural strengths of the three types of cement matrices shown in Table 1 show substantially the same level of performance. The cement matrices differ in the mean particle diameter $\phi_A$ of the aggregate particles 2 and in the blended weight ratio WR (=S/Y) of the aggregate particles (weight S) to the total weight (Y) of the cement (weight C) and the mineral admixture (weight A), which are indicative of the mutual bond resistance between the fibers and the cement matrix.

Meanwhile, Table 2 shows specifications including characteristics of the fibers used in the bond resistance tests and the like.

TABLE 2

| Fiber | Material | Tensile Strength (MPa) | Cross Sectional Area (mm$^2$) | Circumference (mm) | Parameters of Asperity Pattern h/H | Parameters of Asperity Pattern p/B | Referential Diagram |
|---|---|---|---|---|---|---|---|
| Example f-1 | PP Fiber | 640 | 0.220 | 2.373 | 0.3 | 4.0 | FIG. 1 |
| Example f-2 | PP Fiber | 640 | 0.385 | 3.804 | 0.1 | 1.0 | FIG. 3 |

TABLE 2-continued

| Fiber | Material | Tensile Strength (MPa) | Cross Sectional Area (mm²) | Circumference (mm) | Parameters of Asperity Pattern | | Referential Diagram |
|---|---|---|---|---|---|---|---|
| | | | | | h/H | p/B | |
| Comparative Example f-1 | PP Fiber | 640 | 0.220 | 2.373 | No Asperity | | FIG. 1 |
| Comparative Example f-2 | PP Fiber | 640 | 0.385 | 3.804 | No Asperity | | FIG. 3 |
| Comparative Example f-3 | PVA Fiber | 880 | 0.308 | 2.243 | No Asperity | | — |

As shown in this Table 2, the fiber materials used in the tests are polypropylene fibers (PP fiber) and a polyvinyl alcoholic fiber (PVA fiber). Moreover, the tensile yield strength of each fiber can be found from the product of the cross-sectional area of the fiber and the tensile strength of the fiber. Furthermore, the bonding area can be found from the product of the circumferential length of the fiber and the bonding length thereof (=6 mm). Note that Comparative Examples f-1, f-2 are comparative examples without asperities and should therefore be referred to as examples without the recessed portions 11, 11A when FIGS. 1, 3 are used as their referential diagrams.

Moreover, Table 3 shows combinations of the cement matrices in Table 1 and the fibers in Table 2.

TABLE 3

| Test Name | Cement Matrix | Fiber |
|---|---|---|
| Example-1 | Example m-1 | Example f-1 |
| Example-2 | Example m-2 | Example f-1 |
| Example-3 | Example m-1 | Example f-2 |
| Comparative Example-1 | Example m-1 | Comparative Example f-1 |
| Comparative Example-2 | Example m-2 | Comparative Example f-2 |
| Comparative Example-3 | Comparative Example m-1 | Example f-2 |
| Comparative Example-4 | Example m-1 | Comparative Example f-3 |
| Comparative Example-5 | Example m-2 | Comparative Example f-3 |
| Comparative Example-6 | Comparative Example m-1 | Comparative Example f-3 |

In the combinations of the cement matrices and the fibers shown in Table 3, Example-1 to Example-3 are included as the fiber reinforced cement based mixed material of the one embodiment of the present invention, while Comparative Example-1 to Comparative Example-6 are comparative examples for checking effects of the one embodiment of the present invention.

[Results of Bond Resistance Tests]

Figure 9:
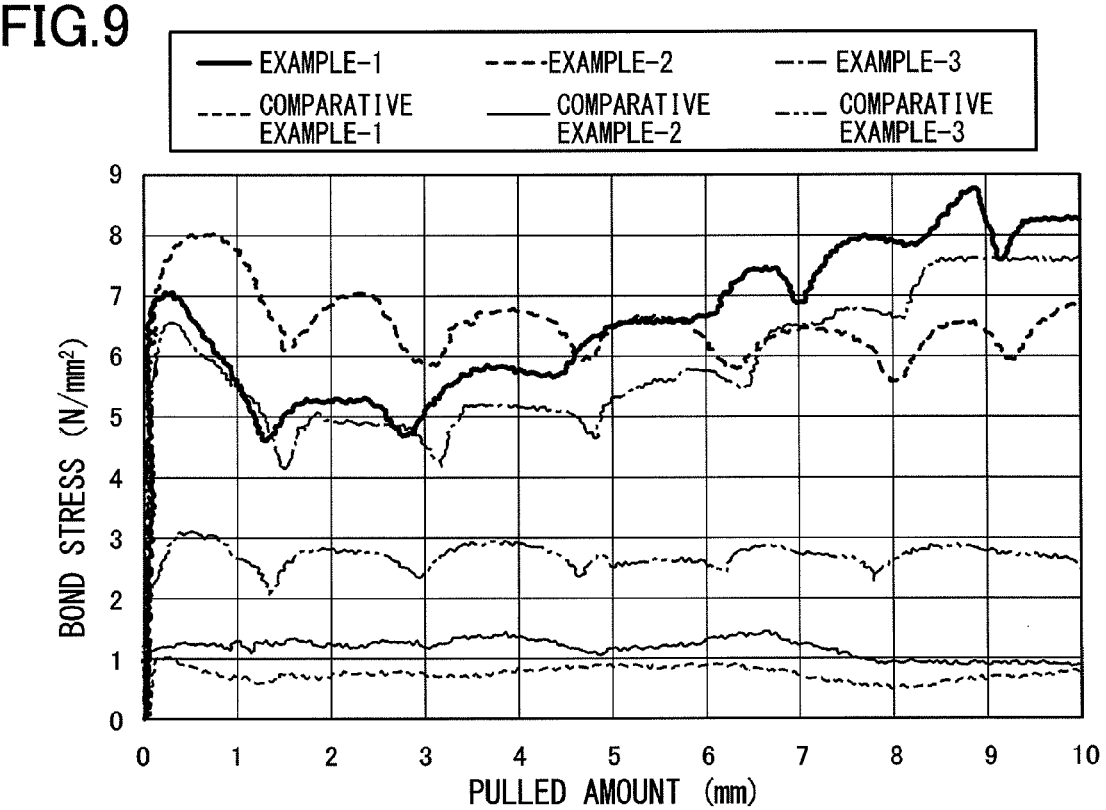
FIG. 9 is a graph describing the results of the bond resistance tests in Example 2 (Example-1 to Example-3, Comparative Example-1 to Comparative Example-3).
Figure 10:
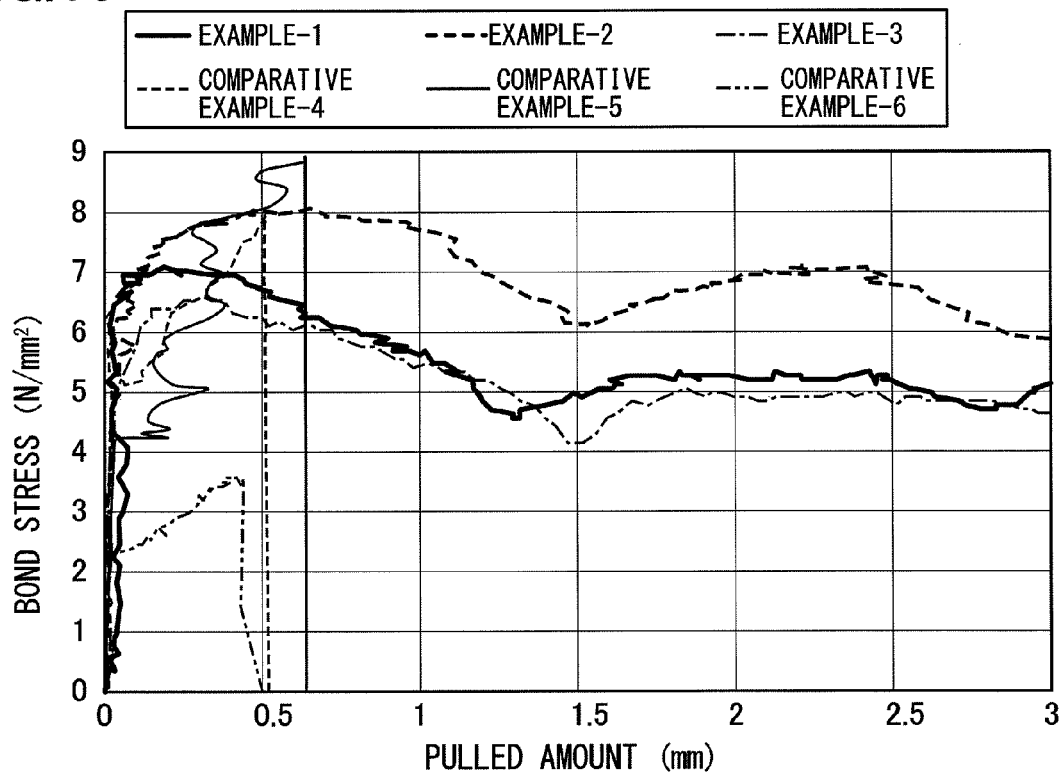
FIG. 10 is a graph describing the results of the bond resistance tests in Example 2 (Example-1 to Example-3, Comparative Example-4 to Comparative Example-6).

FIGS. 9 and 10 show the results of the bond resistance tests on the combinations shown in Table 3. Here, FIG. 9 shows the results of Example-1 to Example-3 in comparison with Comparative Example-1 to Comparative Example-3.

The graph shown in FIG. 9 is a graph showing the relation between bond stress presented in the vertical axis and the pulled amount of the fiber presented in the horizontal axis. Here, the bond stress is a value found by dividing the resisting force exerted against the pulling when the fiber is pulled up, by the bonding area of the fiber (=the circumferential length of the fiber×the bonding length thereof (6 mm)).

From the comparisons in FIG. 9, it can be seen that the bond stress of each Example (Example-1, Example-2, Example-3) shows clearly higher bond stress than that of any of Comparative Examples (Comparative Example-1, Comparative Example-2, Comparative Example-3). Meanwhile, Example-1 and Example-2 differ in the type of cement matrix, but as for the mixed bumpy fiber 1, they use one of the same shape and the same material. On the other hand, Example-1 and Example-3 are the same in the type of cement matrix, but as for the mixed bumpy fiber 1, they use ones of different shapes (the material is the same), respectively.

The results in FIG. 9 show that the bond stress of each Example does not decrease as the pulled amount increases, though fluctuating in a wave pattern. Moreover, in each Example, the bond stress does not decrease even after the pulled amount exceeds 6 mm (=bonding length). Thus, slip shear fracture which can be fatal to the cement matrix may be considered to have not occurred in deteriorated bond zones in the cement matrix in contact with the bonding surface of the bumpy fiber 1.

Moreover, the fact that each Example can produce larger bond stress than any of Comparative Examples may be considered to be because the aggregate particles of the appropriate particle diameters contained in the cement matrix by the appropriate amount engage with the appropriate asperity pattern (the recessed portions 11 and the raised portions 12) provided to the surface of the bumpy fiber 1, thereby allowing excellent mechanical bond, which in turn results in improvement in bond characteristics. Further, the larger bond stress may be considered to be because even when the pulled amount increases, resisting force is newly produced between the asperities given to the fiber surface and the aggregate particles in the cement matrix due to mechanical engagement, which in turn allows sustainable bond to keep being exerted.

Meanwhile, in Comparative Example-1 and Comparative Example-2, the cement matrices are of the same types as those of Example-1 and Example-2, respectively. However, although their mixed fibers are PP fibers made of the same material as that of the Examples, no asperity pattern is provided to the surfaces of the fibers of the Comparative Examples.

The bond stresses of Comparative Example-1 and Comparative Example-2 shown in FIG. 9 show significantly smaller values than the bond stresses of Example-1 and Example-2. The reason may be considered to be that even if the aggregate particles of the appropriate particle diameters are mixed in the cement matrix by the appropriate amount, the flat surface pattern (flat and smooth surface) of the PP fiber makes it impossible to expect the operation of mechanical bond, and that bond stress based on the bond strength and the frictional resisting force of the cement matrix itself is the only bond stress that can be expected.

On the other hand, the bond stress of Comparative Example-3 shows fluctuating behavior in a wave pattern along the increase in the pulled amount and is similar to each Example (Example-1, Example-2, Example-3). However, although Comparative Example-3 employs, as its mixed fiber, the PP fiber of Example f-2 having an asperity pattern, the cement matrix is Comparative Example m-1 in which the mean particle diameter of the blended aggregate particles is outside the limited numerical range of the one embodiment of the present invention. As shown in FIG. 9, Comparative Example-3 as described above shows lower bond stress than that of each Example (Example-1, Example-2, Example-3).

The reason may be considered to be that while Comparative Example-3 can expect mechanical bond as compared to Comparative Example-1 and Comparative Example-2 because of the use of the fiber having an asperity pattern on the fiber surface, the small mean particle diameter of the aggregate particles blended in the cement matrix makes it difficult to achieve strong engagement between the aggregate particles of the cement matrix and the asperity pattern on the fiber surface, and therefore makes it impossible to obtain desired mechanical bond.

Example-3 and Comparative Example-3 both employ the same type of PP fiber having the asperity pattern of Example f-2 as their mixed fibers. However, while the cement matrix of Example-3 is Example m-1, the cement matrix of Comparative Example-3 is Comparative Example m-1 in which the mean particle diameter of the blended aggregate particles is outside the limited numerical range of the one embodiment of the present invention. Thus, in Comparative Example-3, it is difficult to achieve strong engagement between the aggregate particles of the cement matrix and the asperity pattern on the fiber surface, which in turn results in lower bond stress than that of Example-3.

Nonetheless, the weight ratio WR (=S/Y) of the cement matrix for the mixed amount of aggregate particles in Comparative Example m-1 is 49%, which is close a ratio in the preferred range. In other words, the above fact indicates that the assumed effect of the one embodiment of the present invention is exerted by satisfying both conditions for the weight ratio (S/Y) of the aggregate particles of the cement matrix and the ratio (h/H) for the depth h of each recessed portion of the bumpy fiber.

The graph shown in FIG. 10 shows comparisons between Examples (Example-1, Example-2, Example-3) and Comparative Examples (Comparative Example-4, Comparative Example-5, Comparative Example-6). The fibers of Comparative Examples are each a PVA fiber provided with no asperity pattern. For this reason, as can be seen in the result of each Comparative Example, once the bond between the cement matrix and the fiber is cut, the bond stress abruptly decreases as the pulled amount increases.

Note that Comparative Example-4 and Comparative Example-5 are cases where the cement matrices are Example m-1 and Example m-2, respectively, and each initial bond stress is greater than those of Examples. This appears to be because the hydrophilicity of the PVA fiber has functioned, thereby exerting chemical bond to the cement matrix.

[Flexural Toughness Tests]

The bond resistance tests described above make it possible to confirm that the ultra-high-strength fiber reinforced concrete of the embodiment or Example 1 achieves improvement in bond strength through a combination of a cement matrix and an asperity pattern of each fiber, and also that the bond strength is maintained without a large decrease even when the initial bond between the bumpy fiber 1 and the cement matrix decreases once and the bumpy fiber 1 is detached from the cement matrix.

With these results taken into consideration, the following will demonstrate that the ultra-high-strength fiber reinforced concrete of the embodiment or Example 1 exhibits high tensile strength and high toughness through comparisons between Examples and Comparative Examples.

[Testing Method for Flexural Toughness Tests]

The flexural toughness tests were performed according to a standard of Japan Society of Civil Engineers "Test method for bending strength and bending toughness of steel fiber reinforced concrete" (JSCE-G 552-2010). Specifically, this was a testing method in which a specimen in the shape of a square column measuring 10×10×40 cm was subjected to load at trisecting points, and flexure at the center point and the applied load were measured. Moreover, with applied load Q, flexural stress $f_b$ was found using the equation below.

$$f_b = QL/bh^2$$

where $f_b$ represents the flexural stress (N/mm$^2$), Q represents the applied load (N), L represents the distance (span) between the supporting points on the specimen (=300 mm), b represents the width of the specimen (=100 mm), and h represents the height of the specimen (=100 mm). Moreover, the speed of the applied load was adjusted such that the increase rate of the flexural stress would be 0.06±0.04 N/mm$^2$.

Meanwhile, a flexural toughness coefficient is available as a numerical value to indicate the degree of the flexural toughness. Thus, the flexural toughness coefficient was found according to the standard of Japan Society of Civil Engineers "Test method for bending strength and bending toughness of steel fiber reinforced concrete" (JSCE-G 552-2010).

Further, flexural fracture energy is available as a numeral value to indicate the degree of the flexural toughness. This flexural fracture energy is found by integrating areas surrounded by a curve (see FIGS. 11 to 13 to be mentioned later) found in the flexural toughness test.

[Specifications of Examples]

Table 4 shows specifications including characteristics of the cement matrices used in the flexural toughness tests and the like.

TABLE 4

| Cement Matrix | Mean Particle Diameter $\Phi_A$ of Aggregate Particles (mm) | Aggregate/(Cement + Mineral Admixture)S/(C + A)(%) | Compressive Strength $\sigma_c$ (N/mm$^2$) | Flexural Strength $\sigma_b$ (N/mm$^2$) |
| --- | --- | --- | --- | --- |
| Example M-1 | 0.39 | 58 | 206 | 22.3 |
| Example M-2 | 0.42 | 90 | 188 | 22.6 |
| Example M-3 | 0.45 | 62 | 199 | 26.1 |
| Example M-4 | 0.15 | 70 | 187 | 25.0 |
| Example M-5 | 0.46 | 77 | 178 | 22.9 |
| Comparative Example M-1 | 0.15 | 49 | 216 | 23.8 |
| Comparative Example M-2 | 0.81 | 45 | 201 | 25.2 |

The strength characteristics of the cement matrices shown in this Table 4 are results obtained by performing tests on specimens all prepared under the same curing condition. Here, the compressive strength is compressive strength found through a compressive strength test (JIS A 1108) on a specimen in the shape of a circular column measuring ϕ10×20 cm prepared using a cement matrix with no fiber mixed therein.

Moreover, the flexural strength is flexural strength found through a flexural strength test (JIS A 1106) on a specimen in the shape of a square column measuring 4×4×16 cm prepared using a cement matrix with no fiber mixed therein. This flexural strength shows a strong correlation with the tensile strength and the bond strength of the cement matrix.

Meanwhile, Table 5 shows specifications including characteristics of the fibers used in the flexural toughness tests and the like.

TABLE 5

| Fiber | Material | Mixed Ratio (%) | Tensile Strength (Mpa) | Elastic Modulus (GPa) | Cross Sectional Area (mm²) | Length (mm) | Parameters of Asperity Pattern | | Referential Diagram |
|---|---|---|---|---|---|---|---|---|---|
| | | | | | | | h/H | p/B | |
| Example F-1 | PP Fiber | 3.0 | 640 | 10 | 0.220 | 30 | 0.3 | 4.0 | FIG. 1 |
| Example F-2 | PP Fiber | 2.8 | 640 | 10 | 0.220 | 30 | 0.3 | 4.0 | FIG. 1 |
| Example F-3 | PP Fiber | 2.8 | 640 | 10 | 0.385 | 30 | 0.1 | 1.0 | FIG. 3 |
| Example F-4 | PP Fiber | 2.7 | 640 | 10 | 0.220 | 30 | 0.3 | 4.0 | FIG. 1 |
| | Steel Fiber | 0.1 | 740 | 160 | 0.061 | 15 | No Asperity | | — |
| Example F-5 | PP Fiber | 2.7 | 640 | 10 | 0.385 | 30 | 0.1 | 1.0 | FIG. 3 |
| | Steel Fiber | 0.1 | 740 | 160 | 0.061 | 15 | No Asperity | | — |
| Comparative Example F-1 | PVA Fiber | 3.0 | 1000 | 30 | 0.077 | 15 | No Asperity | | — |

In addition to the parameters of the asperity pattern, this Table 5 shows property values of the fiber that influence the result of the flexural toughness test of the ultra-high-strength fiber reinforced concrete such as the material of the fiber, the ratio of the volume of the mixed fiber (Mixed Ratio), the tensile strength of the fiber, the elastic modulus, the cross-sectional area of a single fiber, and the length of the fiber. Here, Example F-4 and Example F-5 correspond to proportions in each of which two kinds of fibers—the bumpy fibers 1 and fibers with no asperity (steel fibers in this instance)—are mixed.

Moreover, Table 6 shows the results of the flexural toughness tests performed on specimens prepared by casting ultra-high-strength fiber reinforced concretes, which are combinations of the cement matrices in Table 4 and the fibers in Table 5, and processing them under the same curing condition.

[Flexural Toughness Curves]

Figure 11:
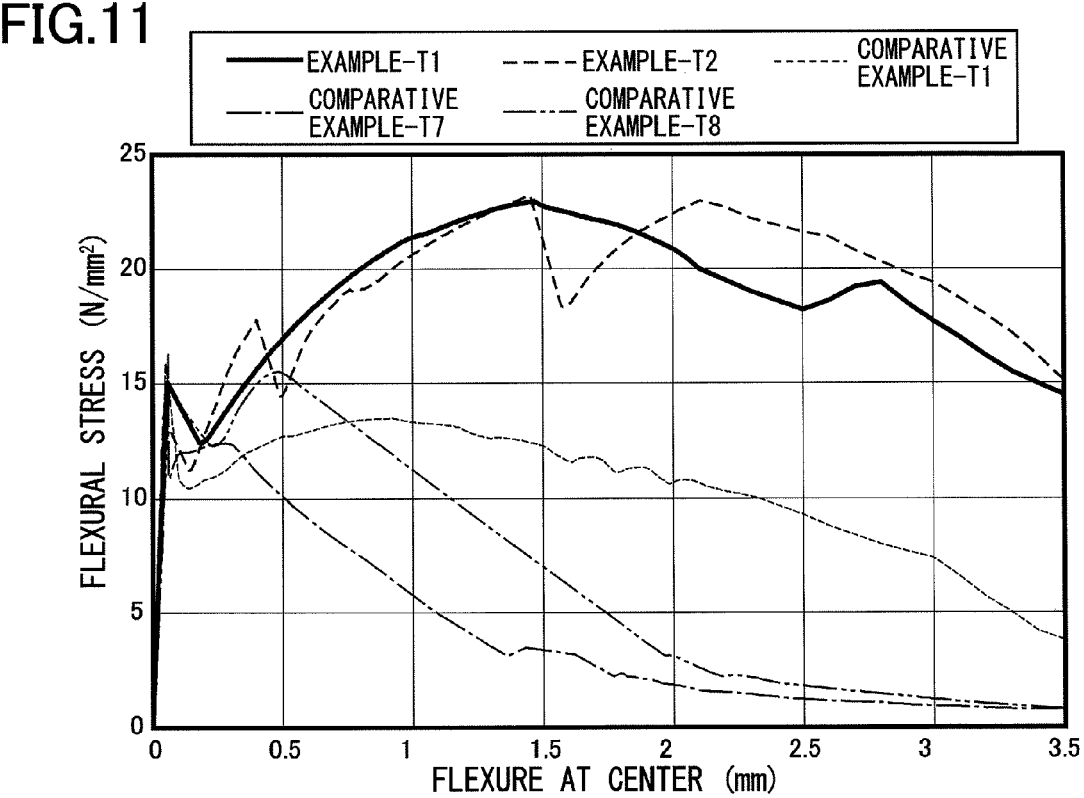
FIG. 11 is a graph describing the results of flexural toughness tests in Example 2 (Example-T1, Example-T2, Comparative Example-T1, Comparative Example-T7, Comparative Example-T8).
Figure 12:
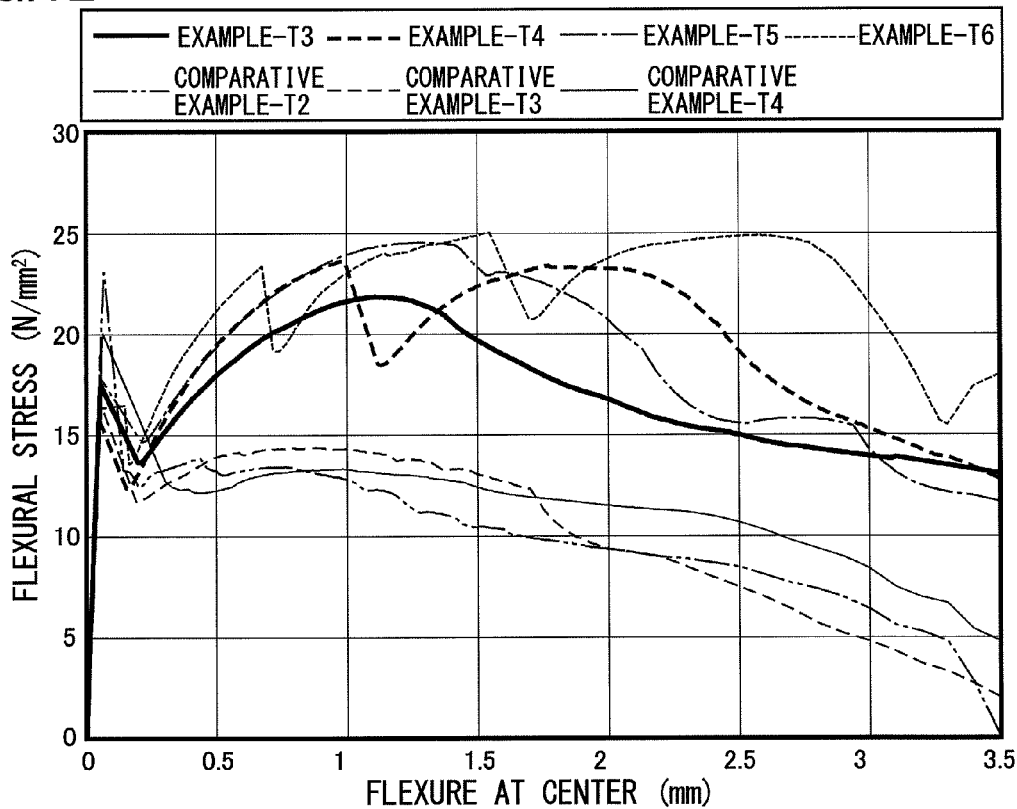
FIG. 12 is a graph describing the results of the flexural toughness tests in Example 2 (Example-T3 to Example-T6, Comparative Example-T2 to Comparative Example-T4).
Figure 13:
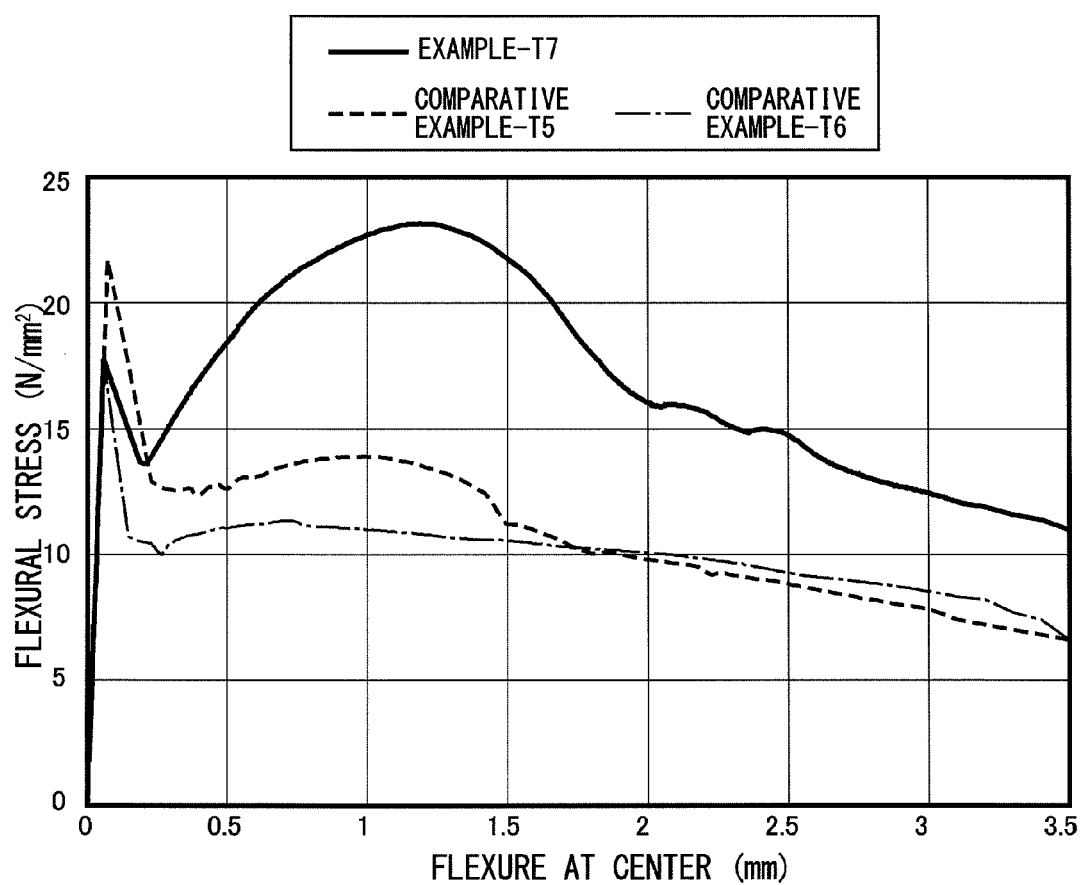
FIG. 13 is a graph describing the results of the flexural toughness tests in Example 2 (Example-T7, Comparative Example-T5, Comparative Example-T6).

FIGS. 11 to 13 each plot the results of the flexural toughness tests in a graph of flexural stress in the vertical axis versus flexure at the center point in the horizontal axis. The flexural toughness curves drawn by the results of the flexural toughness tests behave in common ways, which can be described as follows.

In the initial stage of load application, each flexural toughness curve behaves in such a way that the flexural stress increases straightly with respect to the flexure at the center point, and the flexural stress then decreases abruptly. The zone showing this behavior will be referred to as the "first zone." Also, the peak that appears first will be referred to as the "first peak."

The flexural stress tends to thereafter rise again. This rise occurs either to a level that is greater than the first peak appearing first, or to a level that is not greater. The flexural stress after the rise tends to gently decrease again as the flexure at the center point increases. The zone showing this behavior will be referred to as the "second zone." Moreover, the peak that appears second will be referred to the "second peak."

Now, in the first zone, no cracking occurs in the specimen due to the course of behavior in which the flexure at the center

TABLE 6

| Test Name | Cement Matrix | Fiber | Tensile Strength (Estimate Value) (N/mm²) | Flexural Toughness Coefficient (N/mm²) | Flexural Fracture Energy (N/mm) |
|---|---|---|---|---|---|
| Example-T1 | Example M-2 | Example F-1 | 6.06 | 19.5 | 82.6 |
| Example-T2 | Example M-5 | Example F-1 | 6.13 | 18.8 | 88.5 |
| Example-T3 | Example M-5 | Example F-4 | 5.75 | 18.7 | 77.2 |
| Example-T4 | Example M-1 | Example F-5 | 6.28 | 20.3 | 87.6 |
| Example-T5 | Example M-4 | Example F-4 | 6.51 | 21.3 | 86.0 |
| Example-T6 | Example M-3 | Example F-4 | 6.66 | 21.3 | 96.7 |
| Example-T7 | Example M-4 | Example F-2 | 6.13 | 19.5 | 73.3 |
| Comparative Example-T1 | Comparative Example M-1 | Example F-1 | 3.81 | 12.1 | 32.8 |
| Comparative Example-T2 | Comparative Example M-1 | Example F-4 | 3.80 | 12.1 | 34.6 |
| Comparative Example-T3 | Comparative Example M-2 | Example F-5 | 4.01 | 13.0 | 35.5 |
| Comparative Example-T4 | Comparative Example M-1 | Example F-5 | 3.29 | 13.0 | 41.7 |
| Comparative Example-T5 | Comparative Example M-1 | Example F-2 | 3.61 | 12.8 | 42.9 |
| Comparative Example-T6 | Comparative Example M-1 | Example F-3 | 2.79 | 10.9 | 38.4 |
| Comparative Example-T7 | Comparative Example M-1 | Comparative Example F-1 | 3.02 | 6.5 | 15.6 |
| Comparative Example-T8 | Example M-2 | Comparative Example F-1 | 3.92 | 10.1 | 22.5 | point straightly increases as the load rises in the initial stage. Thus, the behavior can be considered elastic behavior. Moreover, the flexural stress decreases after the first peak, and this can be considered to be because flexural cracking has occurred at the lower end of the specimen around the center thereof, which in turn has caused an abrupt decrease in the flexural stress.

The flexural stress at this first peak is considered to have a positive correlation with the cracking strength of the cement matrix that can be found through a split test. Moreover, although the flexural stress abruptly decreases after the first peak due to the occurrence of flexural cracking at the lower end of the specimen, the flexural stress thereafter shows increasing behavior again. This is behavior occurring because the fibers bridging the cracked surfaces at which the cracking has occurred cover the tensile force. Moreover, the degree of the decrease in the flexural stress after the first peak is such that the higher the rigidity of the fibers, and the larger the mixed amount of the fibers, or the greater the initial bond resistance between the cement matrix and the fibers, the smaller the decrease tends to become.

Moreover, in the second zone, the flexural stress tends to rise again. The second peak after that rise is either greater than the first peak or not greater. The flexural stress rises in this manner because the fibers bridging the cracked surfaces cover the tensile force.

The flexural stress at this second peak has been confirmed, based on test data, to have a strong positive correlation with the tensile strength of the ultra-high-strength fiber reinforced concrete. This tensile strength is the greatest tensile stress found when pure tensile force is applied to the ultra-high-strength fiber reinforced concrete.

Two methods have been used as methods of finding the tensile strength of an ultra-high-strength fiber reinforced concrete material through a test. One method directly finds the tensile strength from a peak of the tensile strength through a direct tensile loading test. This method has a difficulty in controlling the direct tensile loading test itself and therefore has a problem of inconsistent test results.

The other method involves: performing a flexural loading test; finding the relation between the tensile stress and the crack width through an inverse analysis using a load-notch crack width curve or a load-flexure curve obtained from the test; and calculating the tensile strength from the found relation. As for the flexural loading test, there is a case involving forming a notch in the center of the flexural specimen, and a case involving forming no notch. Moreover, this method is advantageous for its simplicity flexure testing method and small inconsistency among tests, but the inverse analysis requires time and cost.

Moreover, after the second peak, the flexure stress tends to gently decrease again as the flexure at the center point increases. This behavior can be considered a phenomenon occurring due to cutting of the bridging fibers or gradual decrease of the bond resistance between the fibers and the cement matrix.

Moreover, the area of a region surrounded by the flexure toughness curve represents the fracture energy of the material. The larger the area, the tougher is the material.

Note that the flexural toughness coefficient shown in Table 6 was found according to the standard of Japan Society of Civil Engineers "Test method for bending strength and bending toughness of steel fiber reinforced concrete" (JSCE-G 552-2010).

[Results of Flexure Toughness Tests]

FIG. 11 is a set of comparisons under the same condition where the mixed ratios of the fibers are all 3.0%, and thus is a set of comparison results excluding such an influential factor that the more fibers are mixed (the higher the mixed ratio is), the higher becomes the flexural strength.

Example-T1 and Example-T2 are combinations of the bumpy fiber 1 of Example F-1 shown in Table 5 and the cement matrices of Example M-2 and Example M-5 shown in Table 4.

On the other hand, the fiber of Comparative Example-T1 is the same bumpy fiber 1 as those Example-T1 and Example-T2. However, the cement matrix uses a material of Comparative Example M-1 which has a small blended weight ratio WR (=S/Y) of the aggregate particles (weight S) shown in Table 4 to the total weight (Y) of the cement (weight C) and the mineral admixture (weight A).

Moreover, the fibers of Comparative Example-T7 and Comparative Example-T8 are each a fiber of Comparative Example F-1 shown in Table 5, which has no asperity pattern formed on the fiber surface. Nonetheless, the material of the fiber is a PVA fiber which is highly hydrophilic, and therefore the bonding force to the cement matrix is considered to be high. Moreover, the cement matrix of Comparative Example-T7 is the material shown in Comparative Example M-1 having a small mean aggregate particle diameter and a small blended weight ratio WR (=S/Y), while the cement matrix of Comparative Example-T8 uses the cement matrix of Example M-2 which is used in Example-T1 and has a blended weight ratio WR (=S/Y) of 90%.

Now, the flexural toughness curves in FIG. 11 show that Example-T1 and Example-T2 show higher flexural stress and higher toughness than Comparative Example-T1, Comparative Example-7, and Comparative Example-T8.

Meanwhile, the first peaks of the five cases shown in FIG. 11 show similar values. However, the second peaks of Example-T1 and Example-T2 show clearly higher values than the other Comparative Examples, and each second peak shows a significantly higher value than its first peak. This indicates that these two Examples have high tensile strength.

Moreover, in Example-T1 and Example-T2, the flexural stress gently decreases also after the second peak, which indicates that the flexural resisting force does not decease until major deformation, i.e. high toughness performance is exhibited. Table 6 mentioned above shows, for each test, tensile strength estimated from the second peak and fracture energy found from the area of the flexural toughness curve. As is clear from the numerical values shown in this Table 6, it can be seen that the tensile strength of each Example is 1.6 to 2.0 times greater than the tensile strength of each Comparative Example, and the fracture energy is 2.5 to 3.6 times greater.

Here, the combination of materials of the flexural toughness test in Comparative Example-T7 is similar to the combination of materials of the bond resistance test in Comparative Example-6. Moreover, in the flexural toughness test in the Comparative Example-T7, the second peak is smaller than the first peak, and also the flexural stress abruptly decreases after the second peak. On the other hand, in the bond resistance test in Comparative Example-6, the initial bond stress is low, and the fiber is pulled out when the pulled amount is about 0.5 mm. This matches the fact that the flexural stress abruptly decreases after the second peak in the flexural toughness test in Comparative Example-T7.

Next, the results of flexural toughness tests shown in FIG. 12 are those obtained by using the fibers shown in Example F-4 and Example F-5 in Table 5, which are hybrid mixed fibers of a PP fiber having an asperity pattern formed on the fiber surface and a steel fiber with no asperity pattern. In Example F-4 and Example F-5, the mixed ratio of all the fibers is 2.8%, and the amount of the fibers (the mixed ratio of 2.8%) is broken down into a mixed ratio of 2.7% for the PP fiber, which is the bumpy fiber 1, and a mixed ratio of 0.1% for the steel fiber having no asperity pattern on the fiber surface.

Moreover, as can be seen from the flexural toughness curves in FIG. 12, each Example has a greater second peak than Comparative Examples, and the area of the flexural toughness curve is greater as well. Moreover, while the second peak of each Example is greater than its first peak, the second peak of each Comparative Example is smaller than its first peak. Further, as shown in Table 6, the numeral values of the tensile strength and the fracture energy are greater for Examples than for Comparative Examples.

The cement matrices employed in Examples-T3, T4, T5, T6 shown in FIG. 12 are Examples M-5, M-1, M-4, M-3, respectively, all of which have their blended weight ratios WR (=S/Y) within a range of 50 to 95%. However, only Example M-4 has a mean aggregate particle diameter of 0.15 which is under the preferable range of 0.2 to 0.8 mm. That is, comparing Example-T5 to Comparative Examples-T2, T3, T4 through FIG. 12 and Table 6 shows that Example-T5 has superior tensile strength and toughness. This indicates that the conditions for the weight ratio (S/Y) of the aggregate particles of the cement matrix and the ratio (h/H) for the depth h of each recessed portion of the bumpy fiber are more important than the other parameters.

Moreover, in the results of flexural toughness tests shown in FIG. 13, the mixed ratio of fibers is 2.8%, and each case uses one kind of fiber. Further, in Example-T7 and Comparative Example-T5, the same fiber is mixed, which is Example F-2 shown in Table 5. However, the cement matrix used in Comparative Example-T5 uses Comparative Example M-1, which is a material having a small mean aggregate particle diameter and a small blended weight ratio WR (=S/Y). As a result, Example-T7 and Comparative Example-T5 come to draw different flexural toughness curves even though they use the bumpy fiber 1 of the same kind. Specifically, while the second peak is greater than the first peak in Example-T7, the first peak is large but the second peak is small in Comparative Example-T5. Moreover, as can be seen also from Table 6, Example-T7 has clearly higher tensile strength and thus higher toughness than Comparative Example-T5 and Comparative Example-T6. Note that while the mean particle diameter of the aggregate particles of the cement matrix employed in Example-T7 is 0.15 mm, which is small, its blended weight ratio WR (=S/Y) is 70%.

From the test results described above, it is found that the ultra-high-strength fiber reinforced concrete of the embodiment can achieve high tensile strength and high toughness which have never been achieved before, through a combination of a given proportion of aggregate particles of a cement matrix and an asperity pattern on the surface of each bumpy fiber 1.

Moreover, preparing that combination does not require mixing special expensive materials; it only requires selecting and using conventionally used materials and is therefore economical.

In other words, the ultra-high-strength fiber reinforced concrete of the embodiment is characterized not by limiting the material of any of the cement matrix and the bumpy fiber 1 to a particular material, but by specifying the mean particle diameter of the aggregate particles of the cement matrix and the weight ratio expressed as aggregate/(cement+mineral admixture) and, as for the bumpy fiber 1, by not specifying the material thereof but only by specifying the asperity pattern on the surface.

Moreover, the tensile strength of the ultra-high-strength fiber reinforced concrete is enhanced because the bond resistance stress between the bumpy fiber 1 and the cement matrix is improved significantly. Furthermore, the enhancement in toughness can be explained by the fact that the bond resistance stress between the bumpy fiber 1 and the cement matrix does not decrease even when detachment of fibers increases, and that these results are obtained due to the combination of an appropriate asperity pattern on the fiber surface and an appropriate proportion of the aggregate particles contained in the cement matrix.

While an embodiment and examples of the present invention have been described in detail above with reference to the drawings, the specific configuration is not limited to the embodiment or the examples, and the present invention encompasses design changes without departing from the gist of the present invention.

For example, while the embodiment and examples discussed above have described cases where an organic fiber is the bumpy fiber 1, the present invention is not limited to this case, and an inorganic fiber such as a steel fiber can be the bumpy fiber.

[Cross-Reference to Relate Application]

This application is based upon and claims the benefit of priority from Japanese Patent Application No. 2011-33090 filed Feb. 18, 2011 in the Japan Patent Office, the disclosure of which is incorporated herein in its entirety by reference.

EXPLANATION OF THE REFERENCE NUMERALS 1, 1A to 1E bumpy fiber
11 recessed portion
11A to 11E recessed portion
13A, 13B recessed portion
12 raised portion
12A to 12E raised portion
2 aggregate particle
h depth
H smallest cross-sectional diameter
p pitch
B largest cross-sectional diameter
C weight of cement
A weight of mineral admixture
S weight of aggregate particles
WR weight ratio
$\phi_A$ mean particle diameter of aggregate particles

The invention claimed is:
1. A fiber reinforced cement based mixed material, comprising:
   Portland cement having a weight C,
   a mineral admixture having a weight A, and wherein the Portland cement and the mineral admixture have a combined weight Y, wherein the mineral admixture chemically reacts in the presence of the Portland cement, and wherein the mineral admixture includes one of, or a combination of, silica fume, precipitated silica, ground granulated blast furnace slag, ground blast furnace slag, ground air-cooled blast furnace slag, fly ash, volcanic ash, diatomaceous earth, clay silicate, trass, an expansive additive, ground limestone, an ettringite-forming admixture, anhydrite, a polymer dispersion, and redispersible polymer powder obtained from a polymer dispersion,
   water,
   a chemical admixture which includes one of, or a combination of, a high-range water-reducing agent, an air-entraining and high-range water-reducing agent, a plasticizing agent, an anti-foaming agent, a setting accelerating agent, a setting retarding agent, a thickening agent, a shrinkage reducing agent, a quick setting agent, a foaming agent, and a rust-preventive agent, aggregate having a weight S, and fibers in an amount at least sufficient to reinforce the mixed material, and wherein a weight ratio WR of the weight S of the aggregate to the combined weight Y of the Portland cement and the mineral admixture is 50 to 95%, wherein a mean particle diameter of the aggregate is 0.2 to 0.8 mm, and wherein at least some of the fibers have asperities formed in a surface thereof, and wherein the fibers that have the asperities have recessed portions, and wherein a ratio (h/H) of a depth h of each of the recessed portions to a smallest cross-sectional diameter H of the fibers that have the asperities is 0.05 to 0.8.

2. The fiber reinforced cement based mixed material according to claim 1, wherein the fibers that have the asperities are each formed such that a ratio (p/B) of a pitch p of the recessed portions in a longitudinal direction of the fiber that has the asperities to a largest cross-sectional diameter B thereof is 0.3 to 10.0.

3. The fiber reinforced cement based mixed material according to claim 1, wherein a length Li of each of the fibers is 1 mm or longer, a ratio (Li/d) thereof to a mean cross-sectional diameter d is 10 to 500, and a total volume of the fibers is 0.7 to 8% of an entire volume.

4. The fiber reinforced cement based mixed material according to claim 1, wherein a ratio (Lm/Dmax) of a mean length Lm of the fibers that have the asperities to a largest particle diameter Dmax of the aggregate is 2 to 20.

5. The fiber reinforced cement based mixed material according to claim 2, wherein a length Li of each of the fibers is 1 mm or longer, a ratio (Li/d) thereof to a mean cross-sectional diameter d is 10 to 500, and a total volume of the fibers is 0.7 to 8% of an entire volume.

6. The fiber reinforced cement based mixed material according to claim 2, wherein a ratio (Lm/Dmax) of a mean length Lm of the fibers that have the asperities to a largest particle diameter Dmax of the aggregate is 2 to 20.

7. The fiber reinforced cement based mixed material according to claim 3, wherein a ratio (Lm/Dmax) of a mean length Lm of the fibers that have the asperities to a largest particle diameter Dmax of the aggregate is 2 to 20.

8. The fiber reinforced cement based mixed material according to claim 5, wherein a ratio (Lm/Dmax) of a mean length Lm of the fibers that have the asperities to a largest particle diameter Dmax of the aggregate is 2 to 20.

* * * * *